(12) United States Patent
Pereira Da Cunha Ribeiro Valente

(10) Patent No.: US 9,731,474 B2
(45) Date of Patent: Aug. 15, 2017

(54) PANEL WITH CORE LAYER

(71) Applicant: STAKLITE IP, LLC, Fredericksburg, VA (US)

(72) Inventor: Antonio Manuel Pereira Da Cunha Ribeiro Valente, Porto Salvo (PT)

(73) Assignee: STAKLITE IP, LLC, Fredericksburg, VA (US)

( * ) Notice: Subject to any disclaimer, the term of this patent is extended or adjusted under 35 U.S.C. 154(b) by 374 days.

(21) Appl. No.: 14/351,370

(22) PCT Filed: Oct. 12, 2012

(86) PCT No.: PCT/US2012/059883
§ 371 (c)(1),
(2) Date: Apr. 11, 2014

(87) PCT Pub. No.: WO2013/106112
PCT Pub. Date: Jul. 18, 2013

(65) Prior Publication Data
US 2014/0315041 A1    Oct. 23, 2014

Related U.S. Application Data

(60) Provisional application No. 61/547,170, filed on Oct. 14, 2011, provisional application No. 61/547,172, (Continued)

(51) Int. Cl.
B32B 3/26  (2006.01)
B32B 3/28  (2006.01)
(Continued)

(52) U.S. Cl.
CPC .......... B32B 3/266 (2013.01); B32B 3/08 (2013.01); B32B 3/12 (2013.01); B32B 3/28 (2013.01); B32B 21/14 (2013.01); E04C 2/3405 (2013.01); E04C 2002/3427 (2013.01); Y10T 428/12368 (2015.01); Y10T 428/24339 (2015.01)

(58) Field of Classification Search
USPC .................. 428/139, 174, 178, 186, 597
See application file for complete search history.

(56) References Cited

U.S. PATENT DOCUMENTS 2,969,586 A * 1/1961 Victor ........................... 428/597
4,203,268 A   5/1980 Gladden, Jr. et al.
(Continued)

FOREIGN PATENT DOCUMENTS

JP   2006-256003 A   9/2009
KR   10-0921373 B1   10/2009

OTHER PUBLICATIONS

International Search Report and Written Opinion issued in PCT/US2012/059883, mailed on Jul. 25, 2013.

*Primary Examiner* — Joanna Pleszczynska
(74) *Attorney, Agent, or Firm* — Patent Portfolio Builders PLLC

(57) ABSTRACT

Method and panel with increased strength. The panel includes a base layer configured to have plural first protuberances; a core layer located on the base layer and configured to have plural second protuberances and to accommodate the plural first protuberances of the base layer; and a top layer in direct contact with the plural first protuberances and the plural second protuberances.

20 Claims, 27 Drawing Sheets

Related U.S. Application Data filed on Oct. 14, 2011, provisional application No. 61/578,906, filed on Dec. 22, 2011, provisional application No. 61/712,543, filed on Oct. 11, 2012.

(51) Int. Cl.
| | | |
|---|---|---|
| *E04C 2/34* | (2006.01) | |
| *B32B 3/12* | (2006.01) | |
| *B32B 21/14* | (2006.01) | |
| *B32B 3/08* | (2006.01) | |

(56) References Cited

U.S. PATENT DOCUMENTS

| | | |
|---|---|---|
| 4,348,442 A | 9/1982 | Figge |
| 6,102,766 A | 8/2000 | Leadbetter et al. |
| 6,110,567 A * | 8/2000 | Bird .............................. 428/178 |
| 6,158,178 A | 12/2000 | Jeffers et al. |
| 7,404,650 B2 | 7/2008 | Ano et al. |
| 2002/0028318 A1* | 3/2002 | Clark ........................... 428/178 |

* cited by examiner

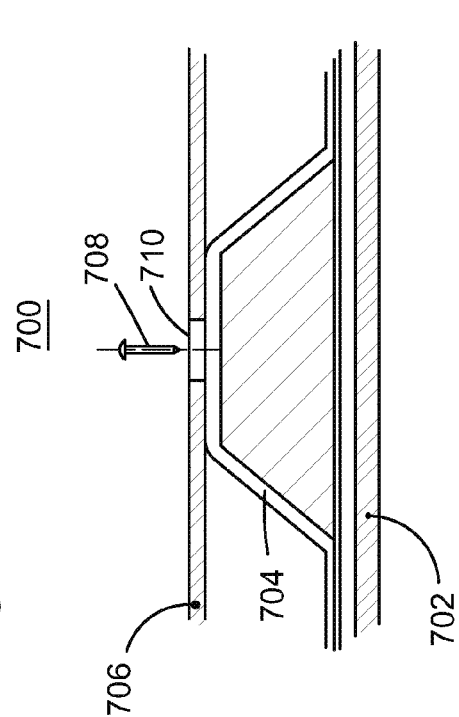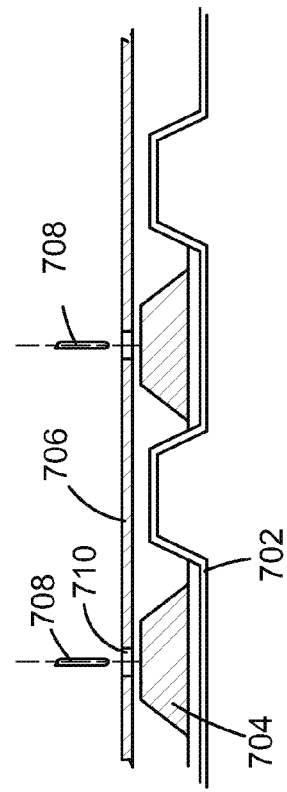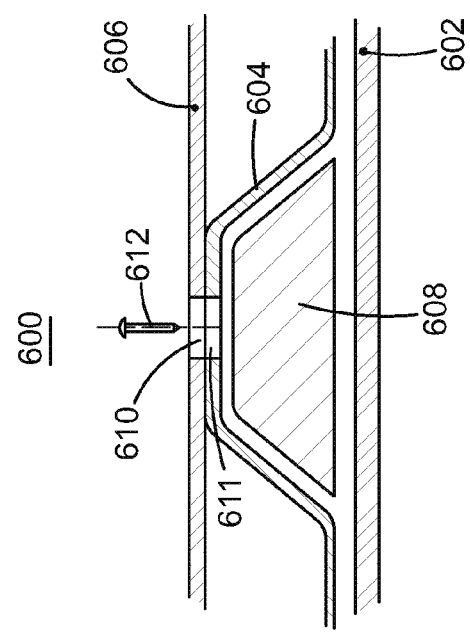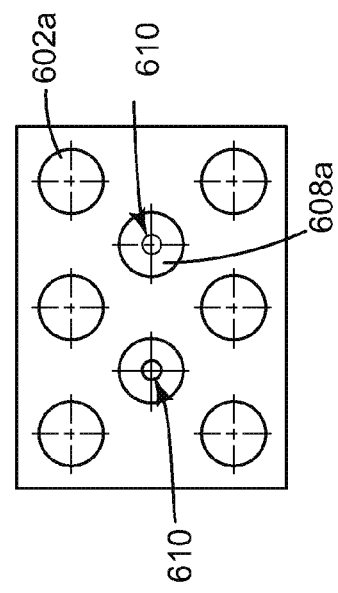
Figure 16A
Figure 16B
Figure 15A
Figure 15B

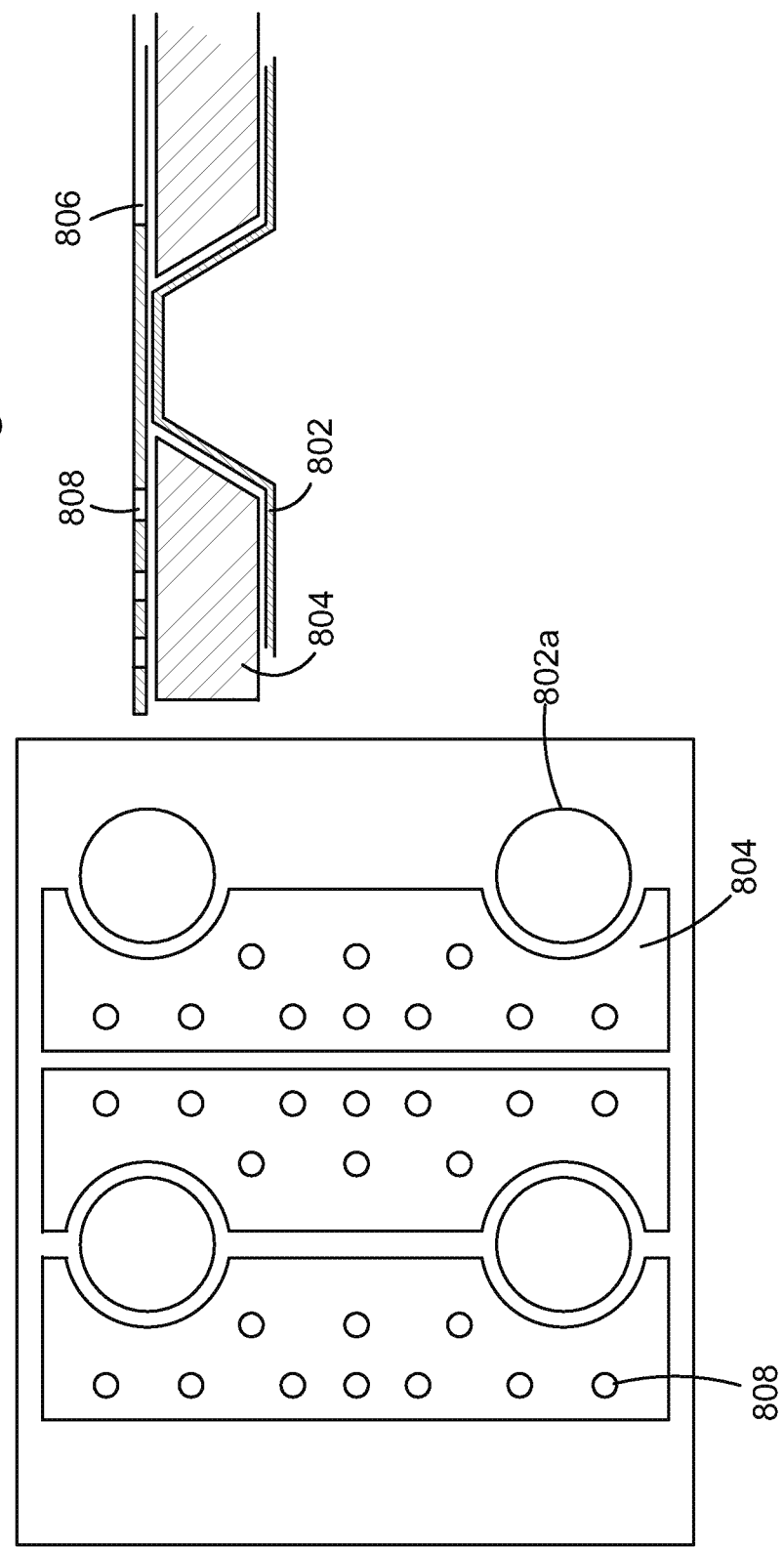

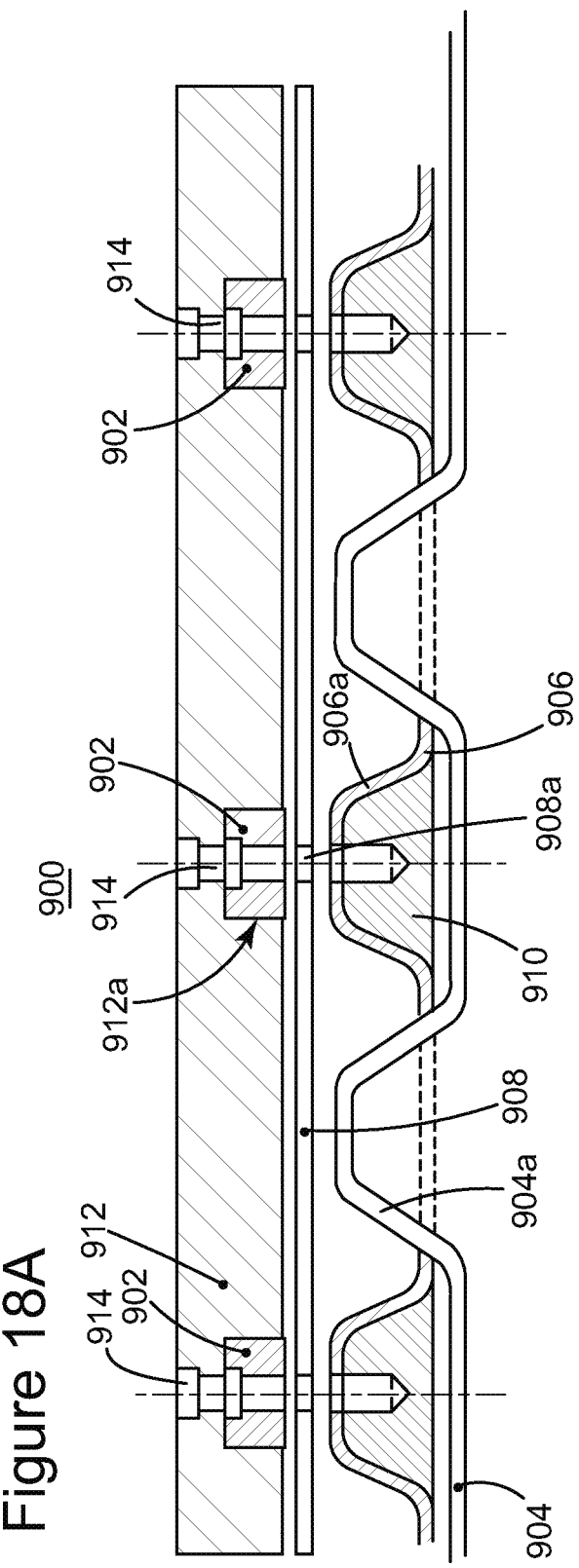
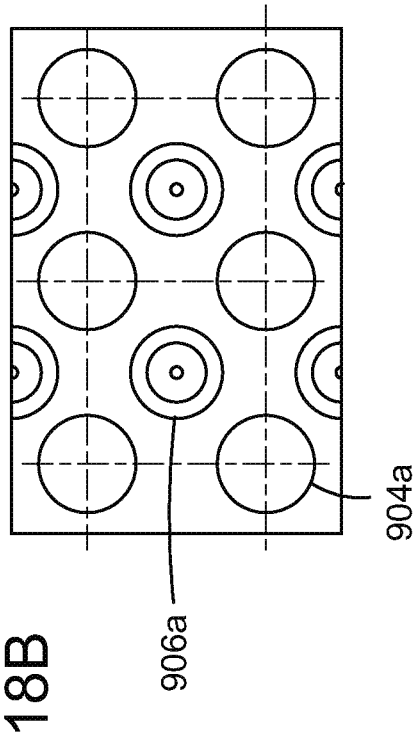
Figure 18B
Figure 18A

PANEL WITH CORE LAYER

BACKGROUND

Technical Field

Embodiments of the subject matter disclosed herein generally relate to methods and systems and, more particularly, to mechanisms and techniques for tailoring the properties and increasing the resistance of a panel structure.

Discussion of the Background

Panels are used in many fields today. For example, the dry cargo container industry uses panels made of plywood for the floor of the containers. These panels need to be made to a certain standard, for example, 28-30 mm in thickness, and to resist intense traffic, loads, impacts, temperature oscillations, humidity, exposure to sea water, bug infestation, etc., depending on the environment in which they are used. The usage of the panels is not limited to the container industry. They are found in many other industries and products. For example, most of the transportation vehicles used today, e.g., cars, buses, rail cars and tankers, naval, airplanes, hypersonic and aerospace, etc., need structural elements that can withstand the conditions noted above.

However, at least in the container industry, there are several problems with the exiting panels that need to be addressed. In addition, as most of these panels are made of a particular type of plywood, i.e., Apitong and/or Keruing, the increasing demand for these trees is unsustainable and container manufacturers and users in this industry are looking for alternative solutions, in which new materials are constantly being investigated while also taking into account the availability, sustainability, cost, strength, longevity and durability of such new materials.

One possible solution is the use of sandwich panels. A sandwich panel 10 includes, as shown in FIG. 1, top and bottom sheets 12 and 14 separated by a core layer 16. The two sheets 12 and 14 are made, preferably, of a thin, stiff and strong material (for example, steel) and the core layer 16 is either made of face-sheet materials or, alternatively, made of a low-density material having a lower stiffness and strength compared to the sheets 12 and 14. Sandwich panels having both top and bottom layers as well as the core made of steel are called steel sandwich panels, steel sandwich structures, or metallic sandwich panels.

As already noted, the core layer 16 may be made of steel and have many different shapes, as shown in FIG. 2. As shown, the form of the core layer 16 may be I-shaped with straight webs, O-shaped with rectangular beams, Vf/V-shaped, or an X-shaped with two hats as a core, etc. Another possibility is to have the core layer 16 made of a polymeric material as illustrated in FIG. 3.

What is common to all these panels shown in FIGS. 1-3 is that loads applied to the top layer 12 are transmitted to the bottom layer 14 through the core layer 16 as there is no direct contact between the top and bottom layers. This lack of contact between the top and bottom layers introduces limitations in the panel strength and joining methods, which is undesirable.

In an effort to increase the resistance of the panel, one solution proposed in WO/2009/034226 (hereinafter the '226 application, the entire content of which is incorporated herein by reference) and illustrated in FIG. 4 (which corresponds to FIG. 1 of the '226 application), provides a top sheet 20 with connection members 22. A first end 24 of the connection member 22 is connected to the top sheet 20 while a second end 26 of the connection member 22 has a fixing surface 28 that is fastened to a bottom sheet 30. An opening 32 is formed in the top sheet 20 when part of the connection member 22 diverges from the top sheet 20. It is noted that this solution does not have a core layer but provides direct contact between the top and bottom layers.

Another solution is illustrated in FIG. 5 and shows a panel 40 that has a bottom sheet 42 and a top sheet 44. Plural indentations (cones/calottes) 46 are made in the bottom sheet 42. These cones 46 are then directly attached to the top sheet 44 when forming the panel 40. While the performance of this kind of panel, for example, resistance to buckling and/or load puncturing, is better compared to other existing panels, its overall performance still does not meet the operating requirements of the container industry. The resistance limitations for this panel arise as a distance between adjacent cones cannot be decreased over a certain value due to the nature of the manufacturing process involved for creating or forming the cones/calottes and the characteristic of the material from which the bottom/calotte sheet is made. Thus, the top sheet 40 has considerable unsupported areas (points) corresponding to locations 48 of the bottom sheet 42 where there are no cones 46. For example, for a metal sheet having a thickness of 1.0 mm and a panel height around 20 mm, two consecutive cones 46 need to be separated by approximately 170 mm or otherwise the cones will break or the sheet will tear when the cones are pressed into the sheet. Expensive and low productivity manufacturing techniques can be employed to overcome the limitations resulting from the combination of material and forming geometries, resulting in an increase in manufacturing cost for the panels which is a trend opposite to that desired by the container industry and in general for all industries and products.

Thus, according to this calotte-type solution, the distance between consecutive cones is large and the strength of the top sheet at points not supported by the cones or calottes is too low to be used as a viable structural flooring solution especially with thin sheet materials (0.5-2 mm).

Accordingly, it would be desirable to provide a panel that reduces or eliminates the afore-described problems and drawbacks as well as others appreciated by those of ordinary skill.

SUMMARY

According to one exemplary embodiment, there is a panel that includes a base layer configured to have plural protuberances; a core layer disposed on the base layer; and a top layer disposed over the core layer and in direct contact with the plural protuberances. The core layer may have plural protuberances configured to directly contact the base layer. This novel panel achieves improved strength because of the direct contact between the base layer and the top layer.

BRIEF DESCRIPTION OF THE DRAWINGS

The accompanying drawings, which are incorporated in and constitute a part of the specification and are not drawn to scale, illustrate one or more embodiments and, together with the description, explain these embodiments. Wherein, in the drawings:

FIGS. 15A and 15B are schematic diagrams of a panel having inserts for accepting nails according to an exemplary embodiment;

FIGS. 16A and 16B are schematic diagrams of a panel having a wood-type core layer with protuberances according to an exemplary embodiment;

FIGS. 17A and 17B are schematic diagrams of a panel having a core layer with no protuberances according to an exemplary embodiment;

FIGS. 18A and 18B are schematic diagrams of a panel having a dampening component according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a panel to be used as a floor for a container. However, the embodiments to be discussed next are not limited to flooring for containers but may be applied to other structures that need to be light and resistant, as for example, packing materials, protective equipment, structures that need to have a good heat conduction, e.g., heat exchangers, structures for electromagnetic shielding or thermal protection systems with increased mechanical and impact resistance, fire, blast and ballistic protection, etc.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a panel with increased resistance includes a base layer that has plural first protuberances, at least one core layer that is non-obstructive (e.g., allows the base layer to contact a top layer) and accommodates the plural first protuberances and has plural second protuberances, and a top layer that contacts the plural first and second protuberances. The core layer is sandwiched between the base and top layers. If more than one core layers are provided, the core layers may have different shapes and properties, to achieve, for example, different goals. Various aspects of this panel are now discussed with regard to the figures.

Advantageously, the non-obstructive core layer can improve the strength of the panel and, at the same time, other material properties, e.g., sound absorption, vibration mitigation, blast and ballistic performance, "self healing," increased functionality, thermal resistance and fluid conduction. In addition, the core layer may include working sensors, e.g., for measuring temperatures, forces, vibrations, or may include actuators, e.g., to counter-act external actions, or may include flow and inflatable plates, e.g., structures where pressure is introduced for creating the final shape and generate strength through compressed air/fluid, etc. As noted, the novel exemplary embodiments to be discussed have many applications in various fields.

Figure 6:
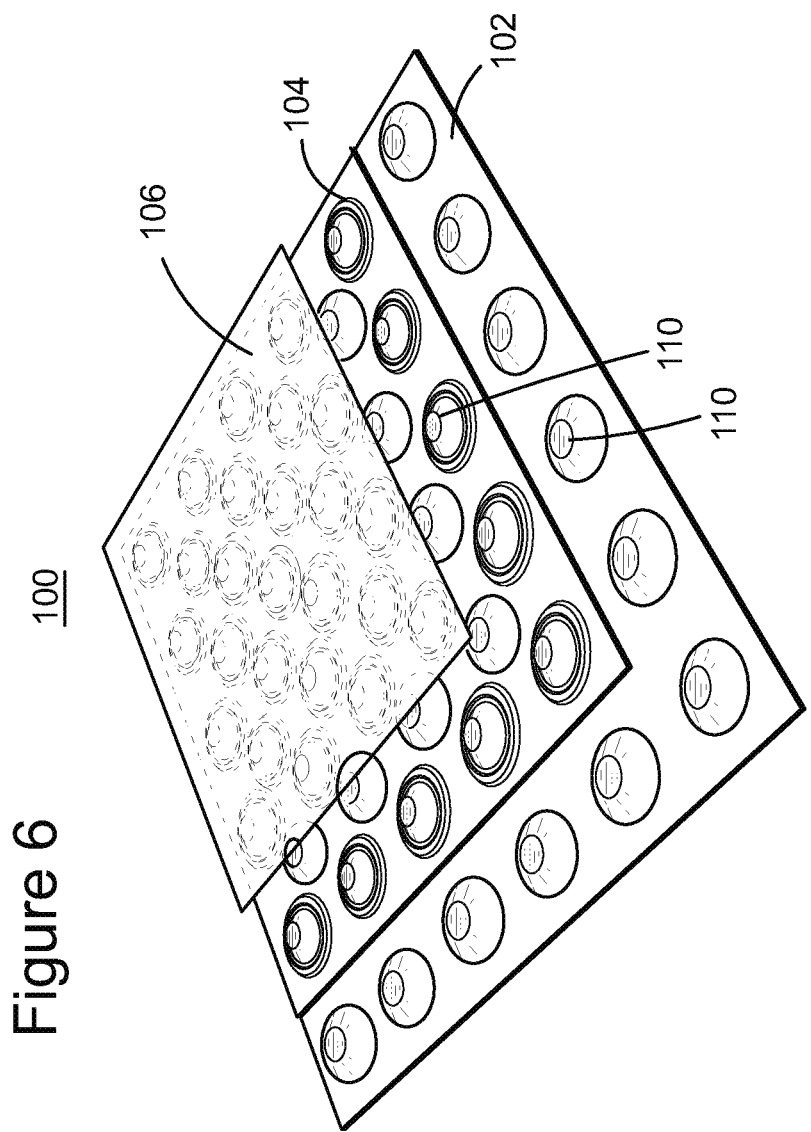
FIG. 6 is a schematic diagram of a panel having a core layer with protuberances according to an exemplary embodiment.

According to an exemplary embodiment illustrated in FIG. 6, a panel 100 has a base layer 102, a core layer 104 and a top layer 106. These layers are shown in the figure with different sizes for a better visualization of the relationships between the layers, e.g., the top layer 106 is smaller and partially cutaway to reveal the core layer 104, which in turn is partially cutaway to reveal the base layer 102. In reality, these layers may be made to have the same sizes. However, as discussed later, it may be possible that the size of the core layer is different from the size of the top and base layers.

The base layer 104 includes plural first protuberances 110. The first protuberances 110 may be pressed from the material of the base layer 104, in which case the protuberances and the base layer are made of the same material. However, in another embodiment, the protuberances 110 are attached to the base layer 104 by various means, for example, glued/bonded, welded, mechanically joined/bolted, etc. In this case, various sets of the protuberances 110 may be made of different materials. However, the protuberances 110 to be attached to the base layer 102 may also be made of a same material as the base layer. In this regard, the base layer may be made of metal, steel, plastic, polymeric and ceramic matrix composites, etc.

Figure 7:
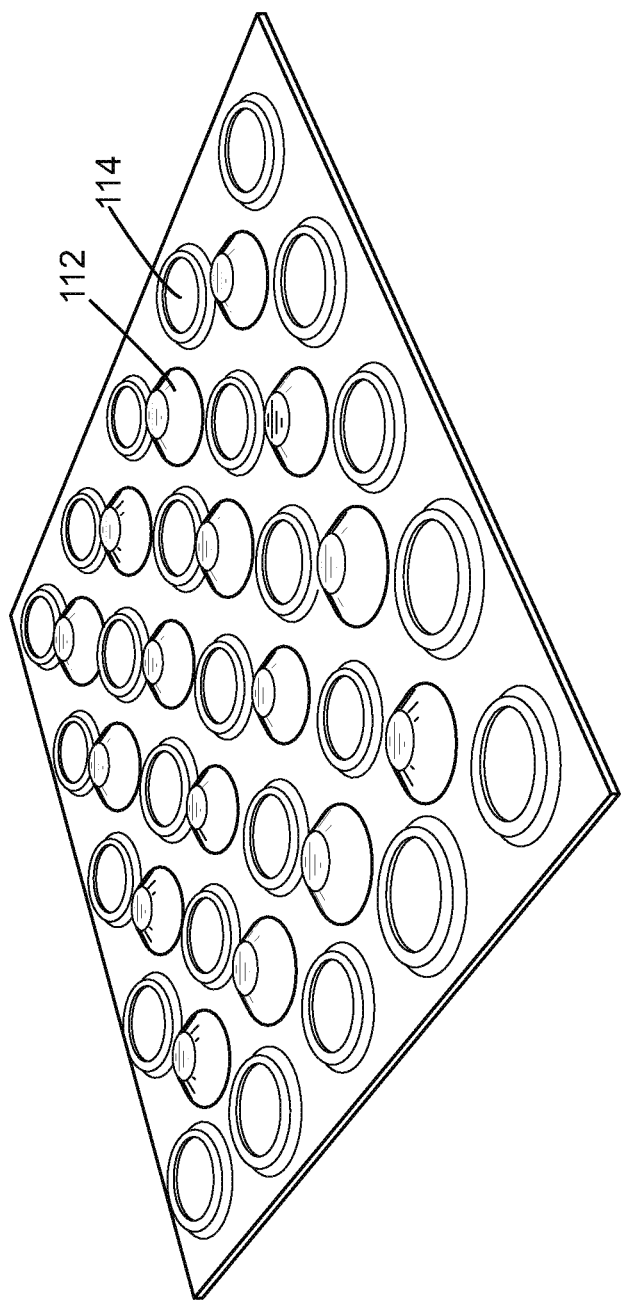
FIG. 7 is a schematic diagram of a core layer with protuberances according to an exemplary embodiment.

The core layer 104, which is also shown in FIG. 7, may include plural second protuberances 112. These second protuberances are formed in the core layer so that they do not overlap with the plural first protuberances 110 of the base layer 102. In this way, support to the top layer 106 is increased as the number of protuberances is substantially doubled comparative to a traditional panel, such as the one illustrated in FIG. 5. As those of ordinary skill will appreciate, one of the advantageous features of the disclosed panels is the fact that the density of protuberances is increased per unit area of the panel without exceeding existing manufacturing limitations for each layer, such as the maximum density of the protuberances per unit area of a layer for a given plate thickness.

The core layer 104 shown in FIGS. 6 and 7 has, in addition to the second protuberances 112, plural holes (or apertures) 114 that are configured to accommodate the first protuberances 110 of the base layer 102. In other words, the first protuberances 110 of the base layer 102 are configured to enter through the plural holes 114 of the core layer 104 so that the first protuberances 110 are capable to directly contact the top layer 106 when the panel 100 is assembled. The holes 114 may be made to tightly or loosely fit around the protuberances 110. The holes 114 are shown in FIGS. 6 and 7 to be circular but other shapes may be used as long as the protuberances 110 are capable to enter through these holes or apertures.

Moreover, in this exemplary embodiment the protuberances 110 and 112 both take the same shape, i.e., frustoconical. Frustoconical shapes can be defined by the radius R1 (e.g., 20 mm or larger) of their top circular surface, the radius R2 (e.g., 45 mm or larger) of their bottom circular surface and their height. For this discussion, the ration of R1/R2 is referred to as the "aspect ratio" of a frustoconical protuberance. According to one embodiment, the protuberances 110 and 112 may have the same values for R1 and R2 (and similar heights adjusted for the thickness of the core layer such that the top circular surfaces of protuberances 110 and 112 are flush with one another). Alternatively, according to another embodiment, the protuberances 110 and 112 may have different values for R1 and the same value for R2, or the same value for R1 and different values for R2. Alternatively, according to another embodiment, the values of R1 and/or R2 may vary for protuberances 110 over the base layer 102, i.e., the aspect ratios of the frustonconical shapes of the protuberances 110 may vary across the base layer to provide varying support or resistance across different regions in a panel. Similarly, the values of R1 and/or R2 may vary for protuberances 112 over the core layer 104 i.e., the aspect ratios of the frustonconical shapes of the protuberances 112 may vary across the core layer to provide varying support or resistance across different regions in a panel. Despite this detailed discussion of exemplary frustoconical shapes for protuberances 110 and 112, it will be appreciated by those skilled in the art that other shapes may be used for either or both protuberances 110 and 112. According to other exemplary embodiments, the protuberances 110 and 112 may take different shapes.

Figure 1:
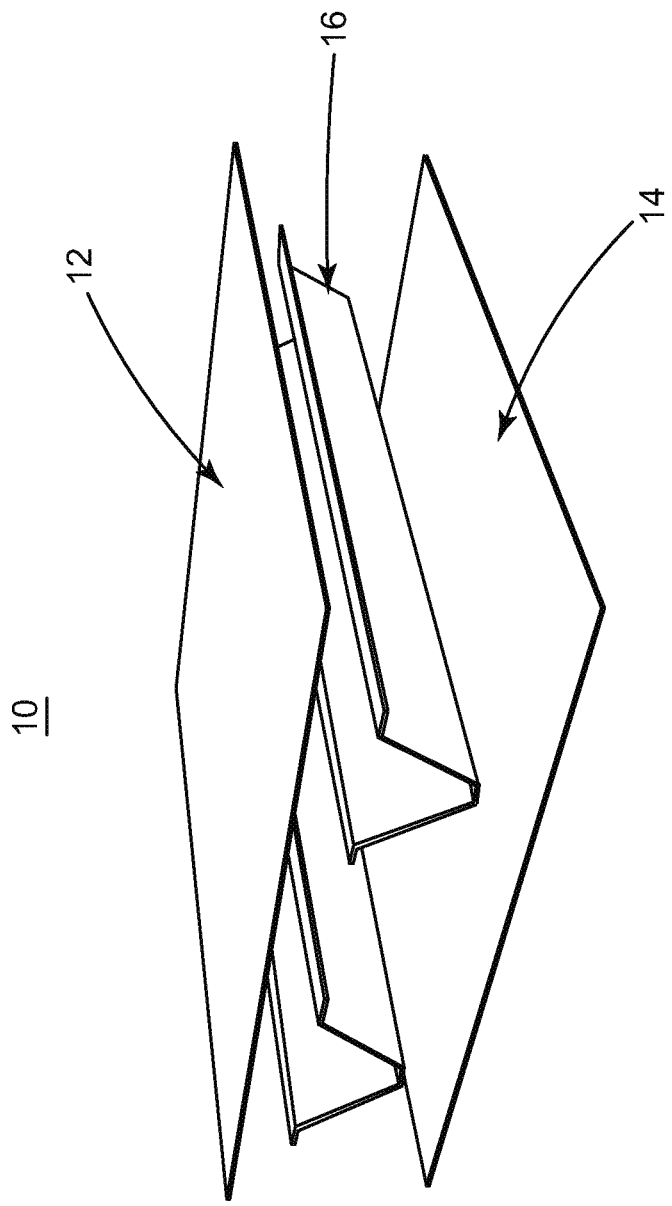
FIG. 1 is a schematic diagram of a conventional panel.
Figure 2:
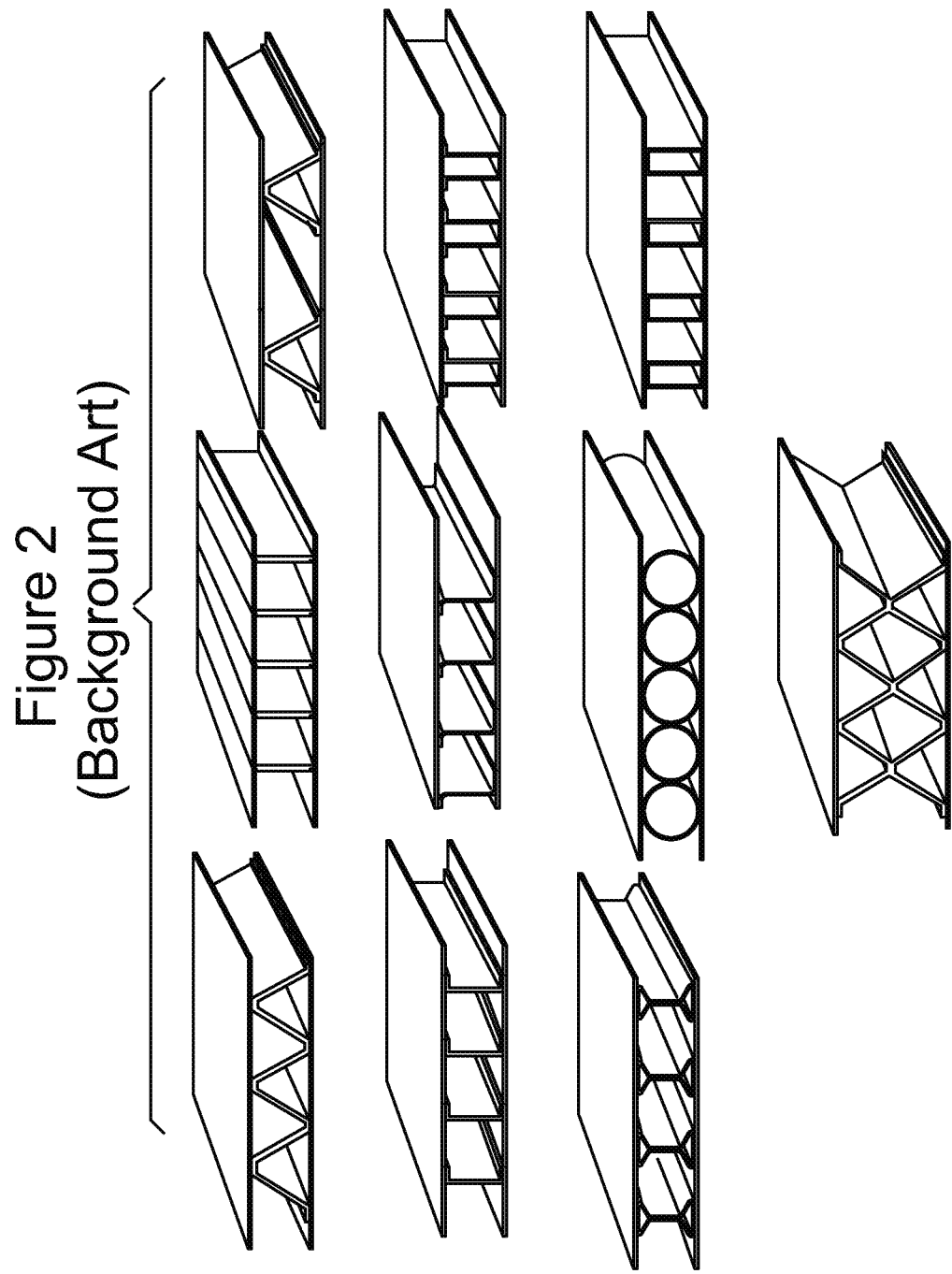
FIG. 2 is a schematic diagram of various core layer shapes of a conventional panel.
Figure 3:
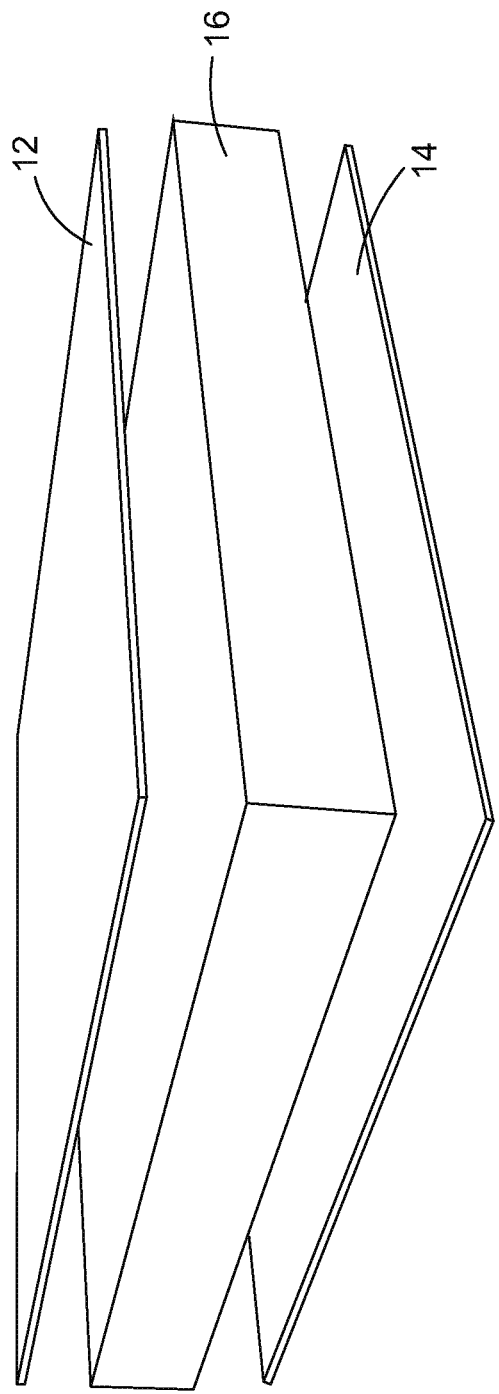
FIG. 3 is a schematic diagram of another conventional panel.
Figure 4:
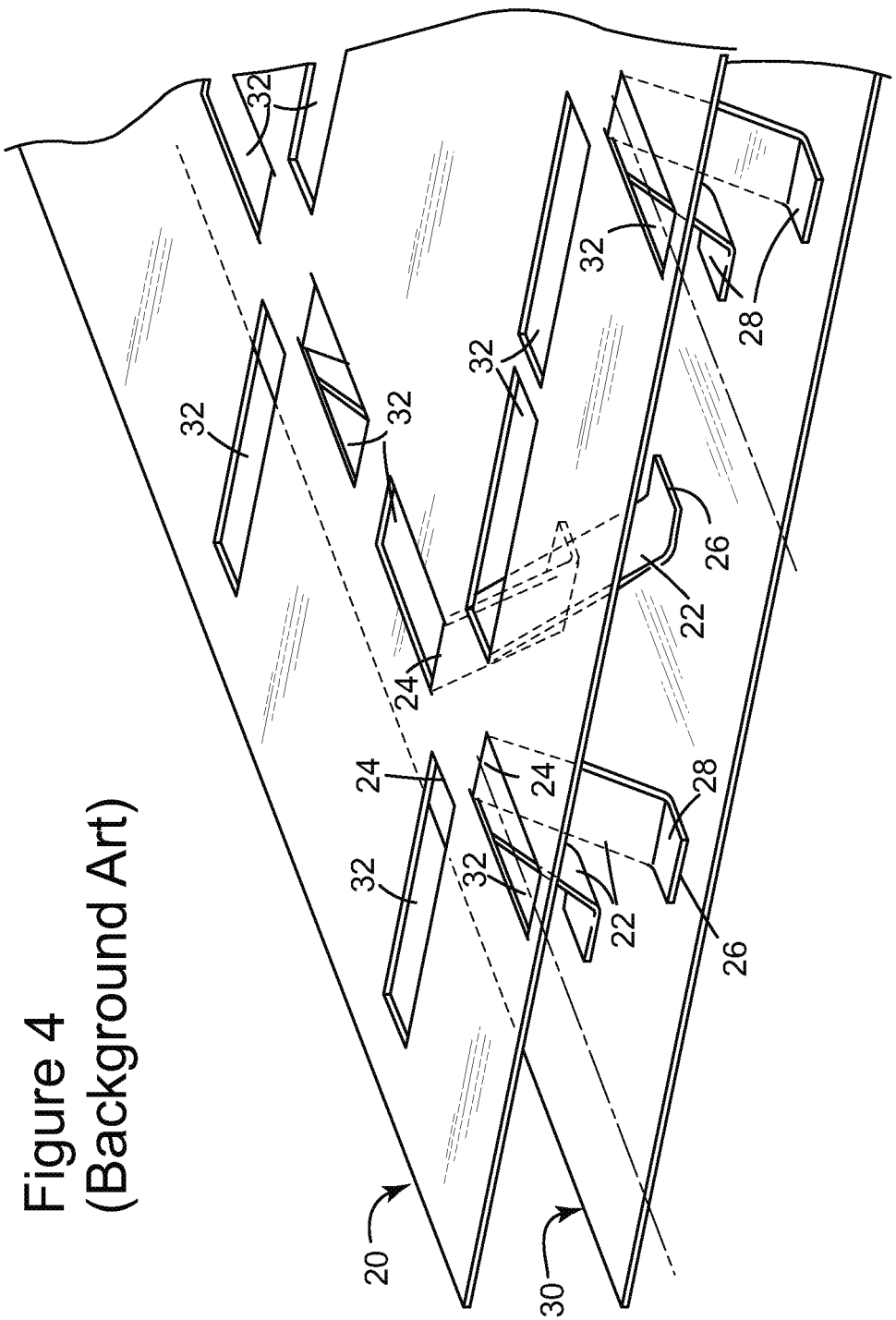
FIG. 4 is a schematic diagram of still another conventional panel.
Figure 5:
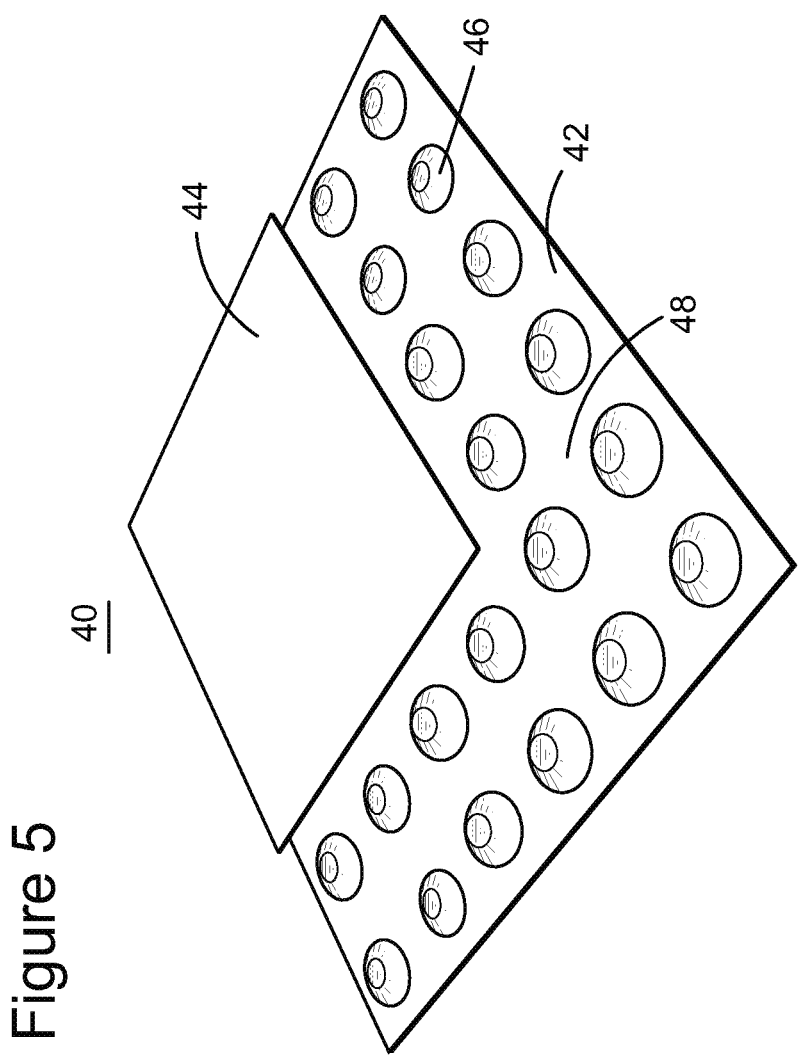
FIG. 5 is a schematic diagram of a calotte-type conventional panel.

It is noted that considering a panel thickness of about 280 mm (those skilled in the art would recognize that this thickness may vary with plus or minus 30 mm) similar to the dimensions discussed for the panel shown in FIG. 5, because of the addition of second protuberances 112 in the core layer 104, an effective distance between two adjacent protuberances is reduced (up to 50%) which provides an increased support of the upper layer 106, and thus, implicitly, an increase resistance of the overall panel. Similarly, the support/contact of the upper layer may be further increased by use of a secondary core layer in a fashion similar to the one just explained. In one application, a panel thickness may be between about 28 to 40 mm and a thickness of each of the base and top layers may be between about 0.5 to 1.0 or between about 1.5 to 2.0 mm. Of course, other dimensions may be used as long as there are technologies available to produce the described protuberances. From this point of view, it is noted that a base or top layer may even have a thickness between 1 and 5 mm. For this situation, the traditional manufacturing processes might not work. Thus, specialized and/or dedicated manufacturing technologies for higher thickness materials may be used. In other words, the novel embodiments are not limited by any thickness or dimension of the used material.

The external surface of the top layer 106 may be configured to be flat (i.e., the side that is not in contact with the protuberances 110 and/or 112) when the panel 100 is used as a flooring surface or other applications. However, depending on the application, the external surface of the top layer may be made to have a different profile.

In one exemplary embodiment, the top layer 106 is configured to be directly attached to both the first protuberances 110 and the second protuberances 112. FIGS. 6 and 7 show the protuberances 110 and 112 distributed along rows and columns. More specifically, the figures show a first row or column of protuberances 110 followed by a second row or column of protuberances 112 followed by a third row or column of protuberances 110 and so on. Also, the figures show that adjacent rows or columns are offset from one another so that a protuberance 110 has four adjacent protuberances 112 and a protuberance 112 has four adjacent protuberances 110 (except for protuberances around the edges of the panel). More specifically, according to this exemplary embodiment, a protuberance 112 can be located on the core layer 104 at the center of a square formed by the centers of four adjacent holes or apertures 114 in the core layer 104 or, stated differently, at the center of a square formed by the centers of four adjacent protuberances 110 in the base layer 102 when the edges of the base layer 102 and the core layer 104 are aligned for joining. However, other arrangements may be possible as would be appreciated by those skilled in the art.

Figure 8:
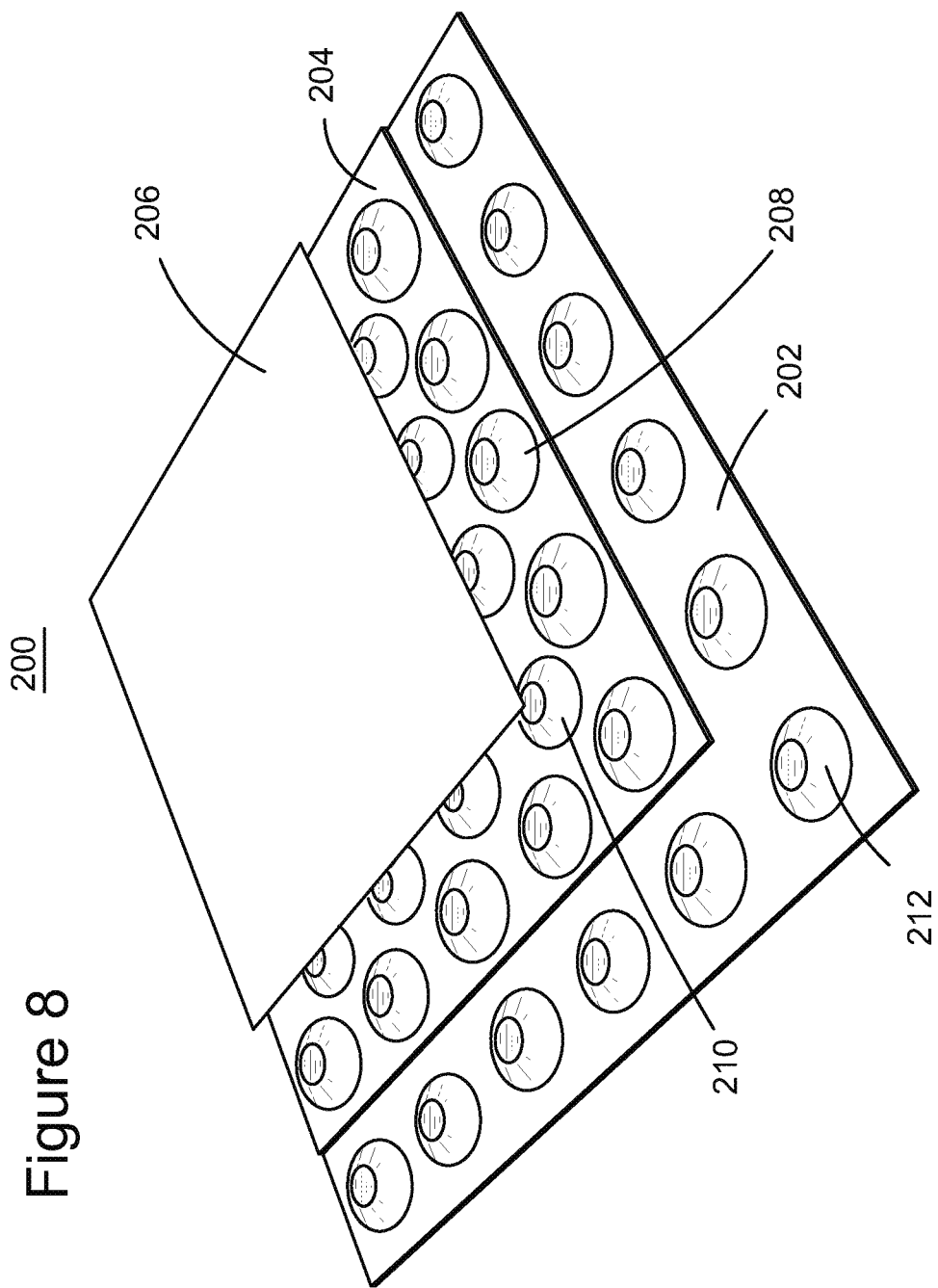
FIG. 8 is a schematic diagram of another panel having a core layer with protuberances according to an exemplary embodiment.
Figure 9:
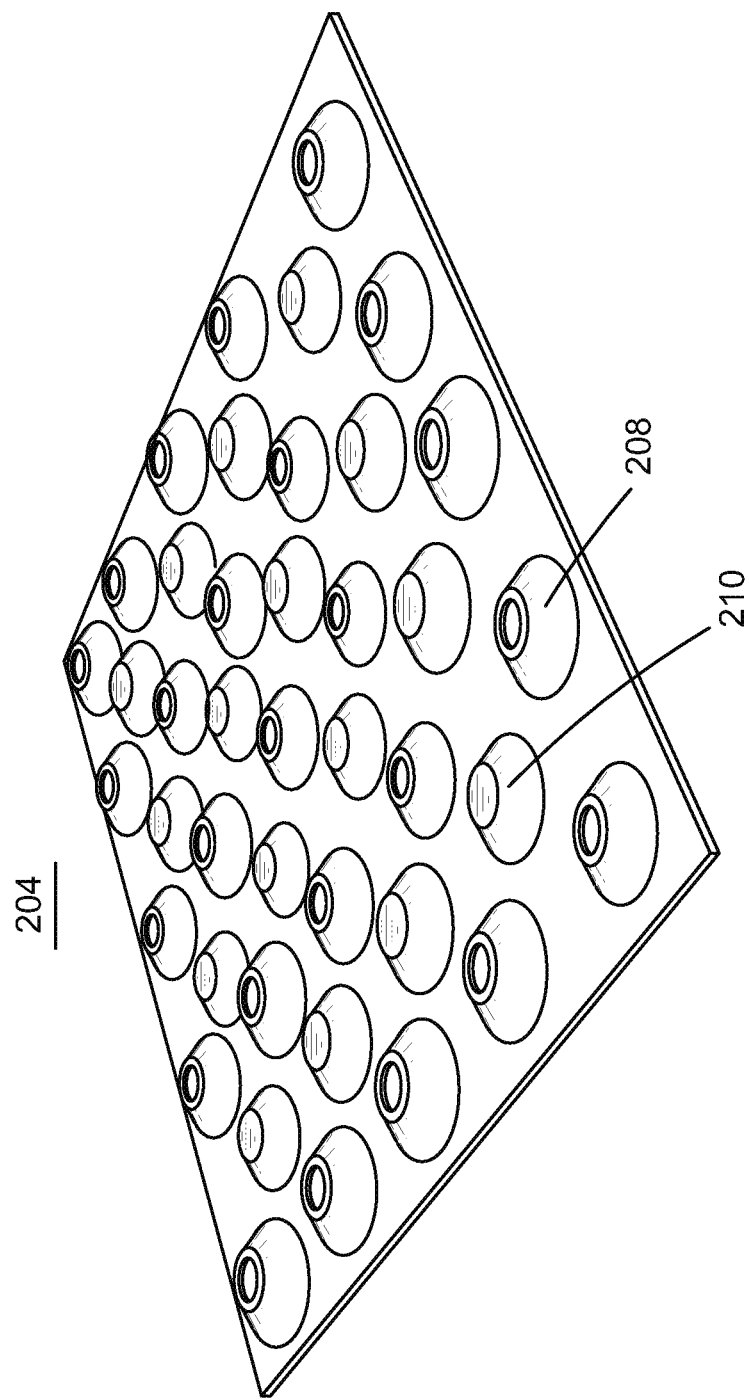
FIG. 9 is a schematic diagram of another core layer with protuberances according to an exemplary embodiment.

According to another exemplary embodiment illustrated in FIG. 8, there is a panel 200 that also includes a base layer 202, a core layer 204 and a top layer 206. A difference between this panel and the panel shown in FIGS. 6 and 7 is the configuration of the core layer 204. As shown in FIG. 8 and also in FIG. 9, the core layer 204 has a first type of protuberances 208 and a second type of protuberances 210. While the protuberances 210 of the core layer are similar to the protuberances of the panel 100 and also similar to the protuberances 212 of the base layer, the protuberances 208 do not have a top part and are configured to cover protuberances 212. In this way, protuberances 212 of the base layer can directly contact the top layer 206. It is noted that the core layer 204 in this embodiment has a higher density of protuberances than the base layer as a material from which the core layer is made is different from the material of the base layer, e.g., composite.

Figure 10A:
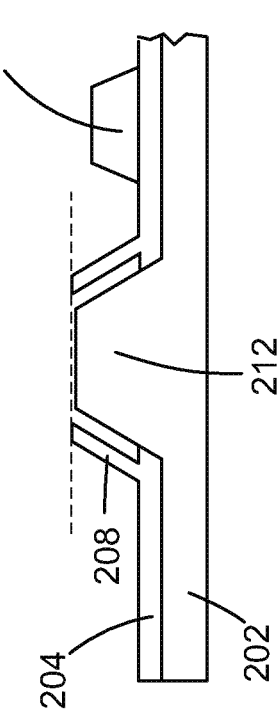
FIGS. 10A and 10B are schematic diagrams of protuberances of a bottom layer and a core layer according to an exemplary embodiment.
Figure 10B:
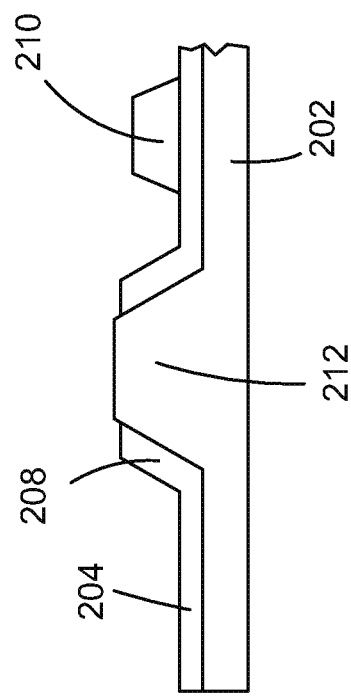

The protuberances 208 may be configured to directly match protuberances 212 as shown in FIG. 10a or the protuberances 208 may have a different shape or size than protuberances 212 as shown in FIG. 10b. Further, it is noted that the height of the protuberances 208 arise equal to or smaller than the height of the protuberances 212. While a distribution of protuberances 208 is shown in the figures following the distribution of protuberances 212, the distribution of protuberances 210 may or may not mirror the distribution of protuberances 212.

An advantage of one or more of the embodiments discussed above is that the core layer promotes a direct contact between the base layer and the top layer while also increasing the density of protuberances in a given panel. In addition, as the density of protuberances increases, the core layer provides extra support to the top layer by having its own protuberances and other potential characteristics and functionalities, thus improving the overall performance of the panel, such as, an increased resistance to common damages that occur to traditional panels when in use, e.g., buckling (localized or otherwise) and punctual load perforation. Depending on the application, a combination of materials may be used, as for example, metallic, polymeric and ceramic matrix composites, similar or dissimilar materials in the same panel. Another advantage is that the manufacturing of these novel core layers may be easily integrated with the manufacturing processes of existing panels.

The top layer may be made of a material that is strong and withstands loads, high energy loads/impacts, etc. For example, the material may be metallic and non-metallic, steel, copper, aluminum, composite, paper, plastic, metallic and non-metallic, fiber metal laminates, composites, magnesium, titanium, polymer reinforced composites, natural fibers, cork, aramid, shape memory alloys, stainless steels, glass and carbon fiber reinforced composites, metal matrix composites, ceramics matrix composites and any combinations of the above materials. The core layer may be made of similar materials. In one application, the base and top layer are made of metal while the core layer is made of a non-metal material, e.g., composite. Many combinations of materials are possible for the panel. The appropriate combination is determined by the purpose of the panel, the environment in which the panel is to be used, its required weight and strength, and/or other factors recognized to those of ordinary skill. In one application, the core layer may be made of formable plywood, which is a composite material that includes special adhesive film that allows the layers to be laid together and formed after manufacture. The adhesive film forms a chemical bond with the wood and this allows forming the plywood by thermo-mechanical processes. The shape is retained once it has cooled again.

Figure 11:
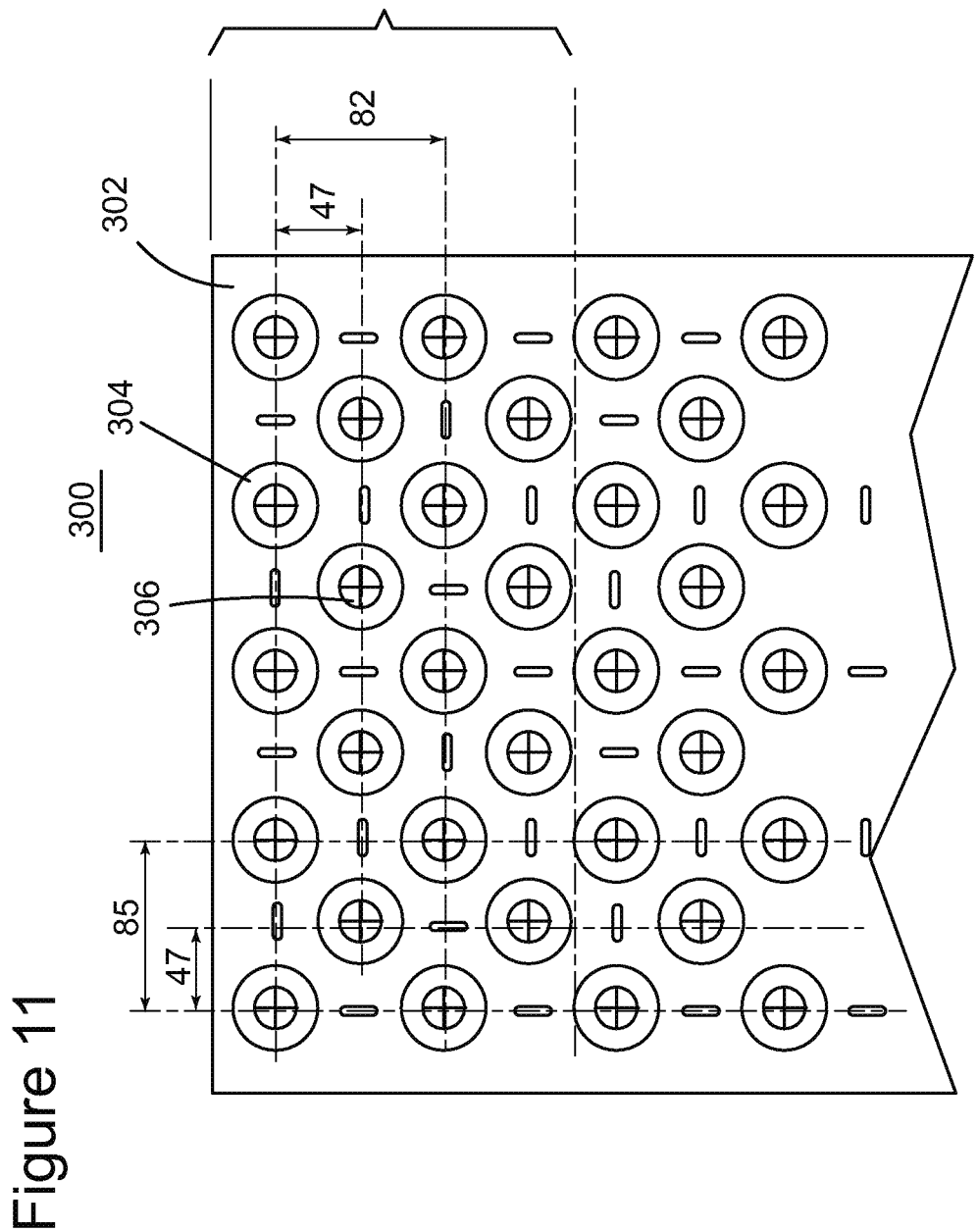
FIG. 11 is a schematic diagram of a bottom layer and its protuberances according to an exemplary embodiment.

In terms of sizes, it is possible to have different lengths and thickness of the layers of the panel as a function of the application. Herein, an example is provided for a cargo container floor. However, the numbers to be provided should not be construed to limit the applicability of the novel panel. Further, the cargo container floor example should not be construed to limit the novel embodiments only to containers. The novel embodiments may be applied to any structural element or component, floor, or wall (packaging material) or protective equipment (e.g., bullet proof vest). The numbers are intended only to provide an example. FIG. 11 shows a panel 300 having a base layer 302. The base layer 302 has a thickness of about 0.5-1.5 mm. Each of the core layer and the top layer (not shown), are intended to have a thickness of about 0.5-1.5 mm so that, taking into account the height of the protrusions, a total thickness of the panel is about 28-30 mm, which currently is a standard thickness requirement for the flooring of a cargo container. Of course, the novel panel may be made to have any desired panel thickness/height, depending on any particular application. Also, for the bottom and top layers, sheets of material having various thicknesses may be used. It is noted that a sheet of material is considered to be what a metal or steel or plastic manufacturer is producing. The top and bottom layers, when made from these sheets, have their own thicknesses that are different from a thickness of the entire panel. A thickness of the panel made by the top and bottom layers is different from a thickness of the sheet or a thickness of the layer.

If the base layer is made from a sheet of steel having a thickness of about 1.0 mm, the protuberances 304 may be pressed to have a height of about 8 to 20 mm (the distance between the top and base layers). However, because of the physical and forming limitations of the materials, and in particular some type of metals, a minimum distance between protuberances 304 is between 160 and 200 mm as shown in FIG. 11. If the protuberances are pressed at a smaller distance, the material sheet can tear off. Thus, for metallic panels, the 160-200 mm range is a typical minimum distance imposed by the characteristics of steel/metallic materials and the height of the protuberances. For other materials and other heights of the protuberances this distance may vary. Also, this distance may be reduced if the protuberances are manufactured separately and then attached to the base layer or using less conventional manufacturing techniques.

A distance between consecutive rows of protuberances 304 is, in one example, about 85 mm. A length L of the base layer may be, for example, 1.5 m to 2.5 m. This size is usually dictated, when using steel, by the steel sheet dimensions provided by the steel manufacturer. In one application, the base layer may have a size that covers the entire floor length (if such material is available) of a cargo container. However, when the size of the base layer is smaller than the entire floor of the cargo container, plural panels need to be connected to each other. A novel mechanism for achieving this connection is discussed later.

Positions for the protuberances of the core layer are indicated by reference number 306. It is noted that the points of support for the top layer are substantially doubled when the protuberances from the core layer are added. This is achieved without further stretching the base layer by an attempt to increase the protrusion density beyond the manufacturing limit for a given thickness of the beginning metal sheet. Thus, a distance between adjacent protuberances is halved, which is not possible for the traditional panels that use a similar base layer with protuberances but no core layer.

Figure 12:
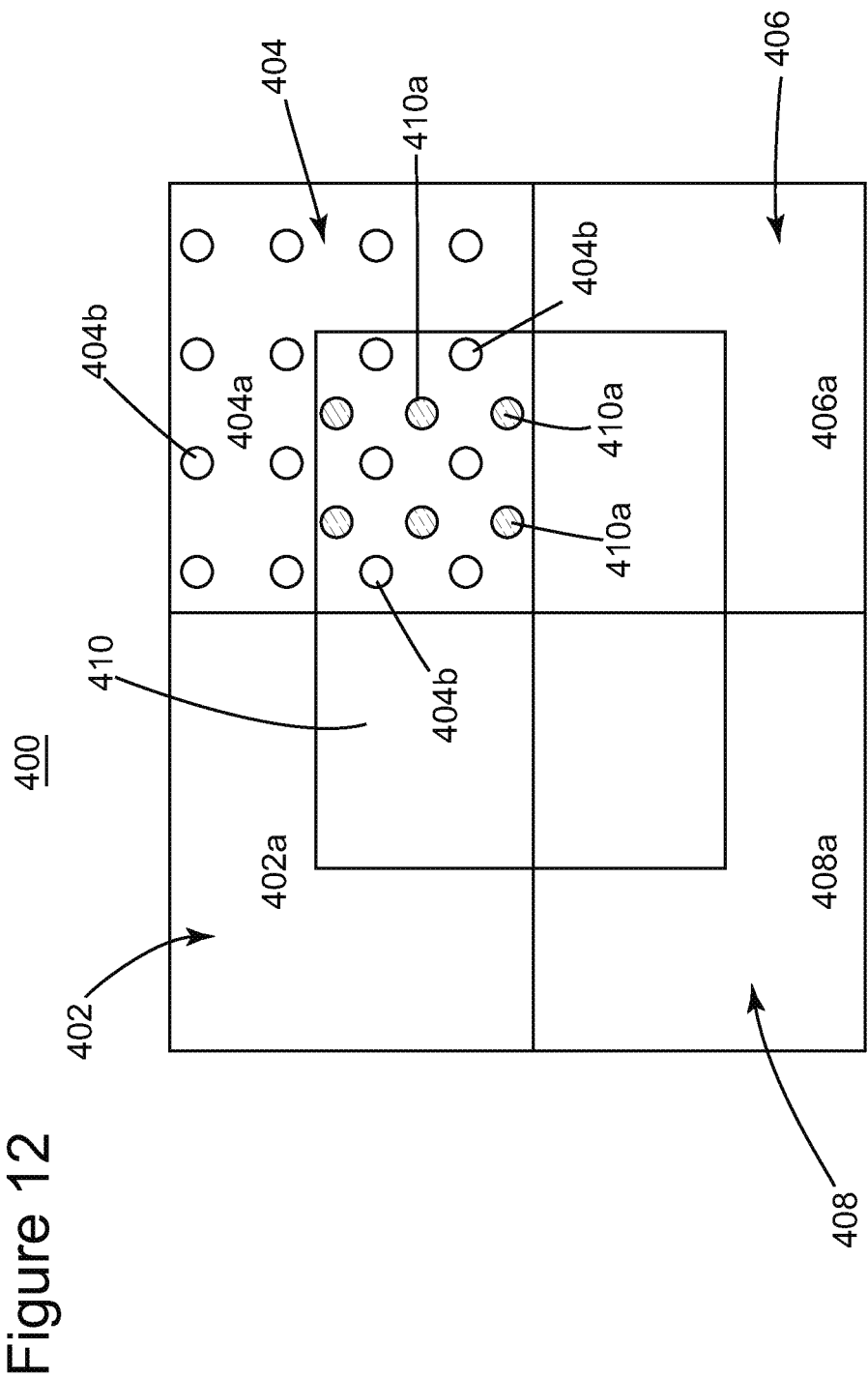
FIG. 12 is a schematic diagram of multiple panels that share a core layer according to an exemplary embodiment.

Considering that multiple panels may need to be attached to each other, FIG. 12 shows one possible approach for connecting these panels. FIG. 12 shows a system 400 that includes four panels 402, 404, 406, and 408 connected to each other. The base layers 402a, 404a, 406a, and 408a of these panels are shown located next to each other and sharing a single core layer 410. The top layers are not shown for simplicity. Part of protuberances 404b of the panel 404 is connected to the core layer 410. The same is true for the other three panels. Thus, the core layer is shared in this exemplary embodiment by four adjacent panels. It is noted that this novel panel connection uses the core layer as a "hinge" and does not need other hinges, welding or other ways for keeping the four panels together.

Figure 13:
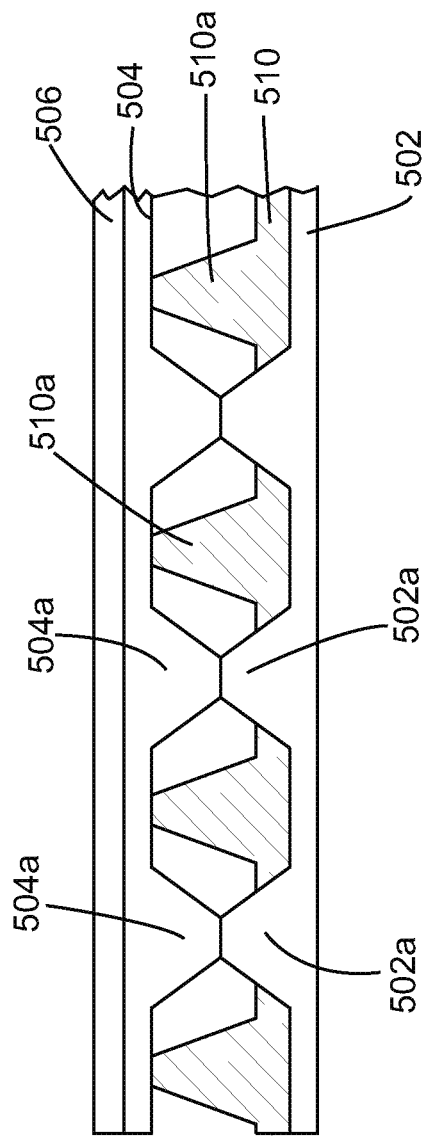
FIG. 13 is a schematic diagram of a panel with two core layers according to an exemplary embodiment.

According to another exemplary embodiment illustrated in FIG. 13, another panel 500 includes a base layer 502, a core layer 504 and a top layer 506. The base layer 502 has plural first protuberances 502a that directly face plural second protuberances 504a of the core layer 504. In other words, tops of the first protuberances 502a contact tops of the second protuberances 504a. This arrangement of the base layer 502 and the core layer 504 increases a thickness of the panel 500, which may be desirable for various applications. However, such a configuration may suffer from the same problems as the panel shown in FIG. 5, i.e., it may not provide enough support points for the top layer 506. Thus, a secondary core layer 510 having its own third protuberances 510a may be provided between the top and base layers. The third protuberances 510a are distributed between the first and second protuberances. To produce the third protuberances with a height that is almost double the height of the protuberances of the base layer, another material than that of the base layer may be used. Alternatively, the third protuberances may be formed separately from the secondary core layer 510 and then attached to this layer.

Figure 14:
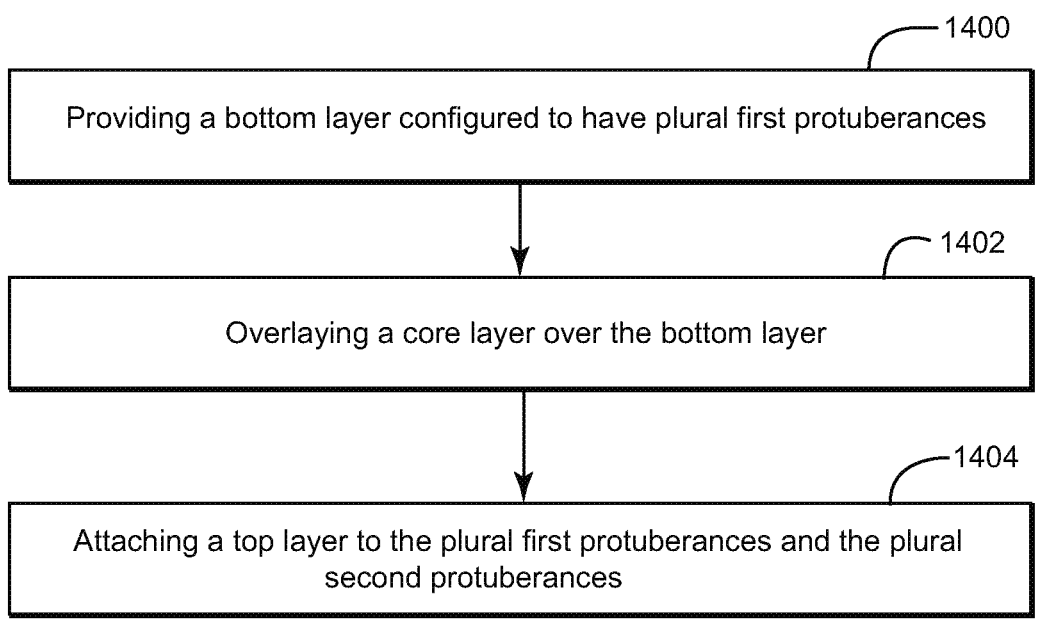
FIG. 14 is a flowchart of a method for assembling a panel according to an exemplary embodiment.

According to an exemplary embodiment, illustrated in FIG. 14, there is a method for assembling one or more of the panels discussed above. The method includes a step 1400 of providing a base layer configured to have plural first protuberances; a step 1402 of overlaying a core layer over the base layer, wherein the core layer is configured to have plural second protuberances and to accommodate the plural first protuberances of the base layer; and a step 1404 of attaching a top layer to the plural first protuberances and the plural second protuberances. Optionally, the step 1404 includes welding the top layer to the plural first and second protuberances.

Optionally, the method may include a step of forming plural openings in the core layer to accommodate the plural first protuberances of the base layer, wherein the plural openings are formed as rows and columns between row and columns of the plural second protuberances. Also, the method may include a step of forming in the core layer plural third protuberances configured to overlay over the plural first protuberances so that tops of the plural first protuberances are configured to directly contact the top layer; and/or a step of tightly fitting the plural third protuberances over the plural first protuberances; and/or a step of providing a space between an inside of the plural third protuberances and an outside of the plural first protuberances. The method may include a step of removing tops of the plural third protuberances, and/or a step of forming the plural third protuberances to have the same height as the plural first protuberances so that both the plural first and third protuberances contact the top layer.

According to a further embodiment illustrated in FIGS. 15A and 15B, a panel 600 may include, besides a base layer 602 having protuberances, a core layer 604 also having protuberances (with or without the top part present) as disclosed in FIG. 6 or 8 (i.e., only protuberances or a mixture of protuberances and openings that receive the protuberances of the base layer), a top layer 606, and inserts 608. Thus, the core layer may include protuberances provided between the protuberances of the base layer, and/or protuberances to fit over the protuberances of the base layer and/or openings to receive the protuberances of the base layer. Optionally, the core layer may include openings to accommodate the protuberances of the base layer. All these features are not shown in these and the next figures because they were illustrated and discussed in FIGS. 6-9. However, it is understood that this and the next embodiments may include any of the features of the previous embodiments. The inserts 608 may be located inside the protuberances of the core layer 604 or inside the protuberances of the base layer 602. FIGS. 15A and 15B shows the inserts 608 provided only under the protuberances 608a of the core layer 608 and not under the protuberances 602a of the base layer 602. The inserts may be attached to the base layer or the core layer (e.g., glued). Openings 610 may be formed in the top layer 606 and openings 611 may be formed in the core layer 604 so that nails (or screws or bolts, or other fasteners) 612 may be attached to the inserts 608. Thus, the inserts 608 are made of a material configured to accept a nail or screw (i.e., not to easily crack) and also to hold the nail tight. Example of such material may be wood or plywood. Other materials, e.g., composite, may be used. The core layer 604 may be made of a metallic material. The panel 600 may then be used, for example, to anchor various goods that are transported in a container.

In another exemplary embodiment illustrated in FIGS. 16A and 16B, a panel 700 may include a base layer 702 having protuberances, a core layer 704 also having protuberances and a top layer 706. If the core layer 704 is made, for example, of wood or plywood, then nails 708 may be driven through openings 710 formed in the top layer 706, directly into the core layer 704. No inserts are necessary for this embodiment as the protuberances of the core layer act as the inserts. In this embodiment, the protuberances may be solid, i.e., not hollow. A side view of this panel is shown in FIG. 16B.

Another exemplary embodiment is illustrated in FIGS. 17A and 17B in which a panel 800 includes a base layer 802 that has protuberances 802a, a core layer 804 that is a block of wood or plywood or other wood-like material that withstands the penetration of a nail or screw or bolt, and a top layer 806 in direct contact with protuberances 802a and the core layer 804. The top layer 806 includes plural openings 808 through which the nails can be directly driven into the core layer 804. FIG. 17A is a top view of the panel while FIG. 17B is a side view of the same panel. In this embodiment, the core layer may occupy all the space between the base and top layers.

Still another exemplary embodiment is illustrated in FIGS. 18A and 18B, in which FIG. 18A is a side view and FIG. 18B is a top view of a panel 900 having a dampening component 902. The panel 900 has a base layer 904, a core layer 906 and a top layer 908 provided in this order. The base layer 904 may have protuberances 904a that directly contact the top layer 908, as in the previous embodiments. However, other types of base layers 904 may be used, e.g., with no protuberances. The core layer 906 may also have protuberances 906a and wood-type inserts 910 inside the protuberances 906a. Alternatively, the core layer 906 may be similar to the core layer disclosed in FIGS. 16A to 17B.

A plywood-type floor 912 may be provided over the top layer 908. Such a panel may be used, for example, in mass transportation structures, a rail car or other types of mass transportation vehicles. The floor 912 may be attached with bolts (or other mechanical joining solution) 914 to the top layer 908. For this reason, openings 908a are preformed in the top layer 908. Thus, a bolt 914 enters through the floor 912 directly into the inserts 910. The dampening component 902 may be located in a corresponding recess region 912a formed in the floor 912. The dampening component 902 may be, for example, a block of polymer, or cork composite, or rubber or other synthetic material that can absorb vibrations. The dampening element 902 is configured to absorb vibrations produced, for example, by the mass transportation vehicle so that the users have a more comfortable ride. FIG. 18B is a top view of the core and base layers, exposing the protuberances 906a and 904a.

Figure 19A:
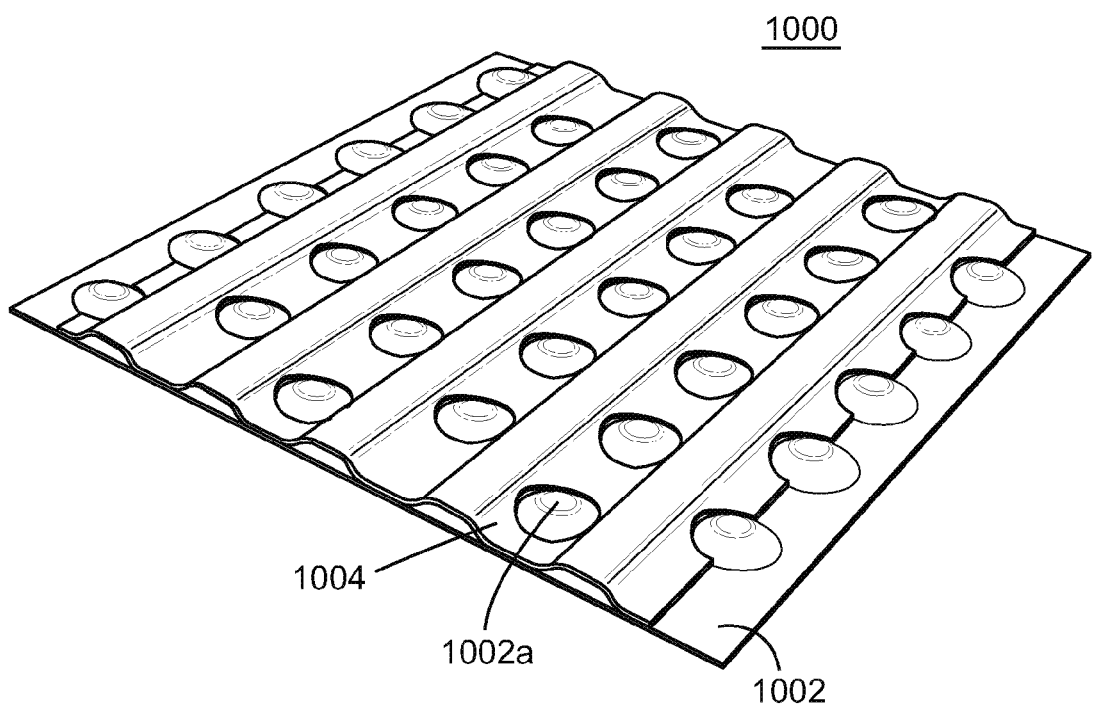
FIGS. 19A-C are schematic diagrams of a panel having a non-flat core layer according to an exemplary embodiment.
Figure 19B:
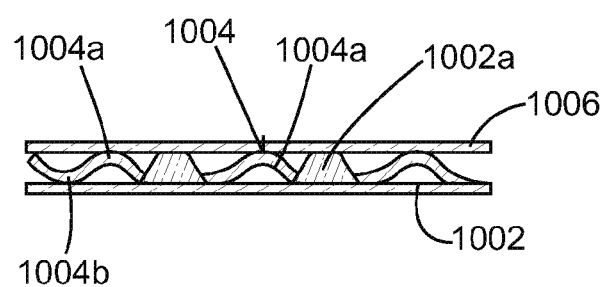
Figure 19C:
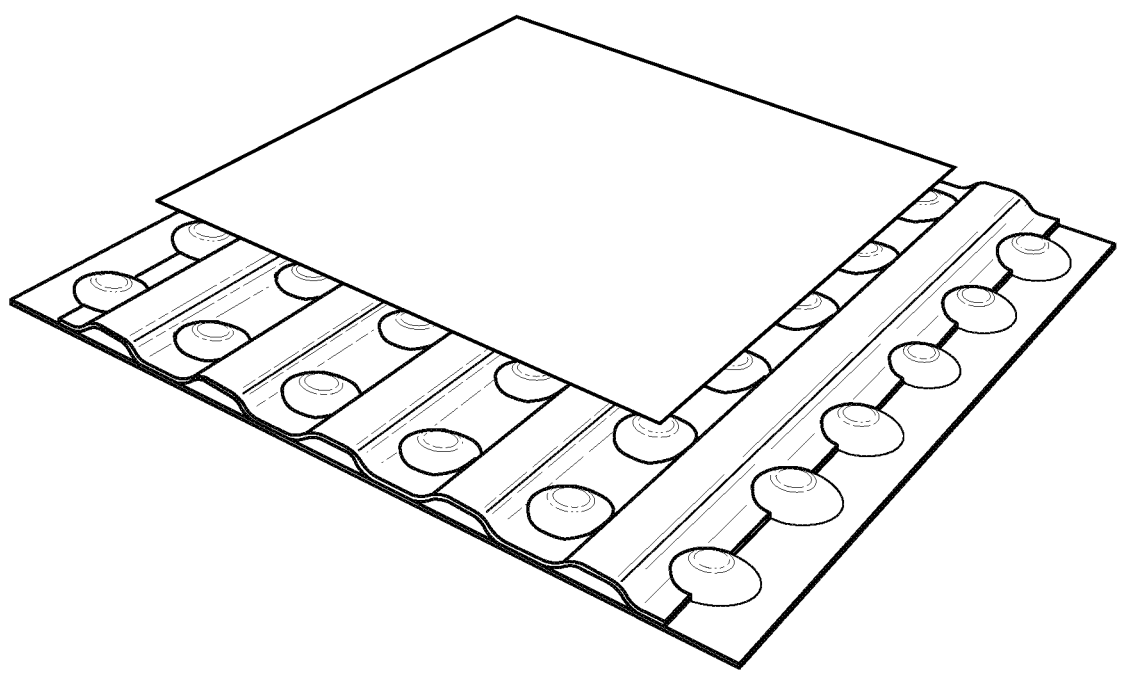

Another exemplary embodiment is discussed now with regard to FIGS. 19A-C. In this exemplary embodiment, the structure of the panel includes a base layer, a core layer and a top layer similar to previous embodiments. However, the core layer of this exemplary embodiment is different from the previous embodiments. More specifically, as shown in FIG. 19A, a novel panel 1000 includes a base layer 1002 having protuberances 1002a, similar to those shown in FIGS. 5-9, and a core layer 1004. The top layer is not shown for clarity. However, the top layer has the property that it is in direct contact with protuberances 1002a.

If the core layer 1004 is made of a material that does not have enough flexibility to deform as, for example, illustrated in FIG. 7, then protuberances in the core layer may not be formed. This appears to be a disadvantage, for example, for core layers made of plywood as no support is provided to the top layer by the core layer. Thus, to also provide support to the top layer, the core layer may be formed to have a corrugated shape (channeled shape) as illustrated in FIG. 19A and also in FIG. 19B. FIG. 19B shows a cross-section of the base layer 1002 and the core layer 1004a, with the core layer 1004a having high regions 1004a (that contact the top layer 1006) and low regions 1004b (that contact the base layer 1002). In other words, the core layer may have non-flat top and bottom surfaces facing the top and bottom layers. In one application, the core layer has an undulating shape. For this exemplary embodiment, the core layer may be made, for example, of plywood. Of course, the core layer may be made of any of the materials discussed above, i.e., metallic, non-metallic, thermo-formable, polymeric, aramid, carbon fiber, fiberglass, plywood, formable plywood, and metal laminate materials.

FIG. 19C shows a similar embodiment as in FIG. 19A but with the protuberances 1002a having a different arrangement, i.e., they are aligned along rows and columns.

Figure 20:
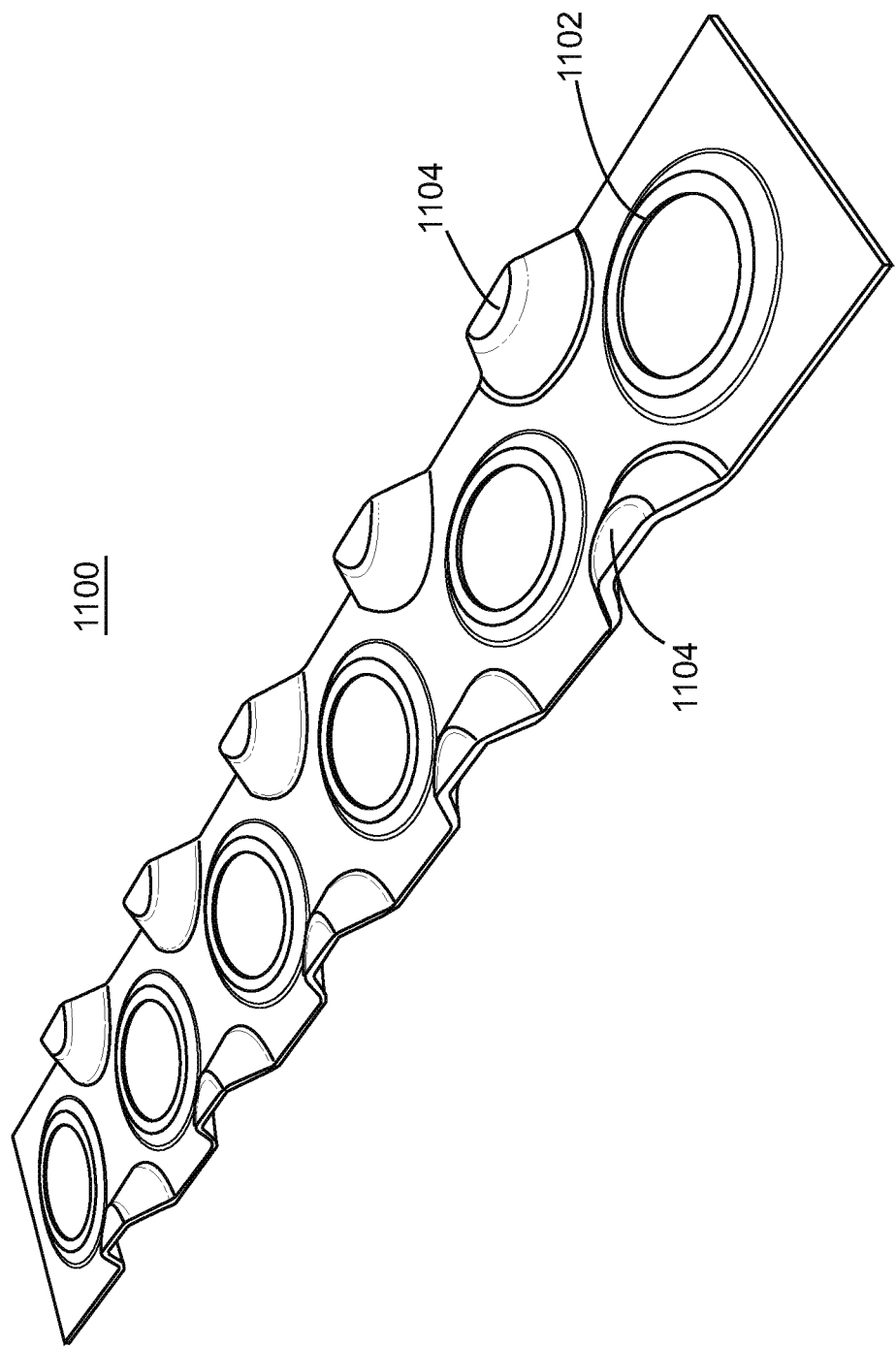
FIG. 20 is a schematic diagram of a core layer made of multiple strips according to an exemplary embodiment.

FIG. 20 shows another possibility of forming a core layer. This figure shows a portion (strip) 1100 of the core layer. According to this exemplary embodiment, multiple strips 1100 may be used together to form the core layer of the previous embodiments. The strips may be connected to each other, for example, glued, welded, screwed, etc. or them may simply be placed next to each other. In one case, the strip 1100 has holes 1102 and/or protuberances 1104 to accommodate the protuberances of the base layer. As shown in FIG. 20, the protuberances 1104 may be partial protuberances. The strips can have different thicknesses and/or may be made of different material grades. In other words, for a same panel, one strip may have a first thickness and an adjacent or non-adjacent strip may have a second thickness, different from the first one. The same is true about the materials of the strips in the same panel. In this way, load path tailoring may be achieved in a single panel or in a floor made of multiple panels. An example not intended to limit the applicability of this novel concept is directed to the floor in a passenger rail car. Thicker and more resistant strips may be used for those places in the car where the passengers walk and less resistant strips may be used for the floor under the seats. Of course, the applicability of load path tailoring is large.

Figure 21:
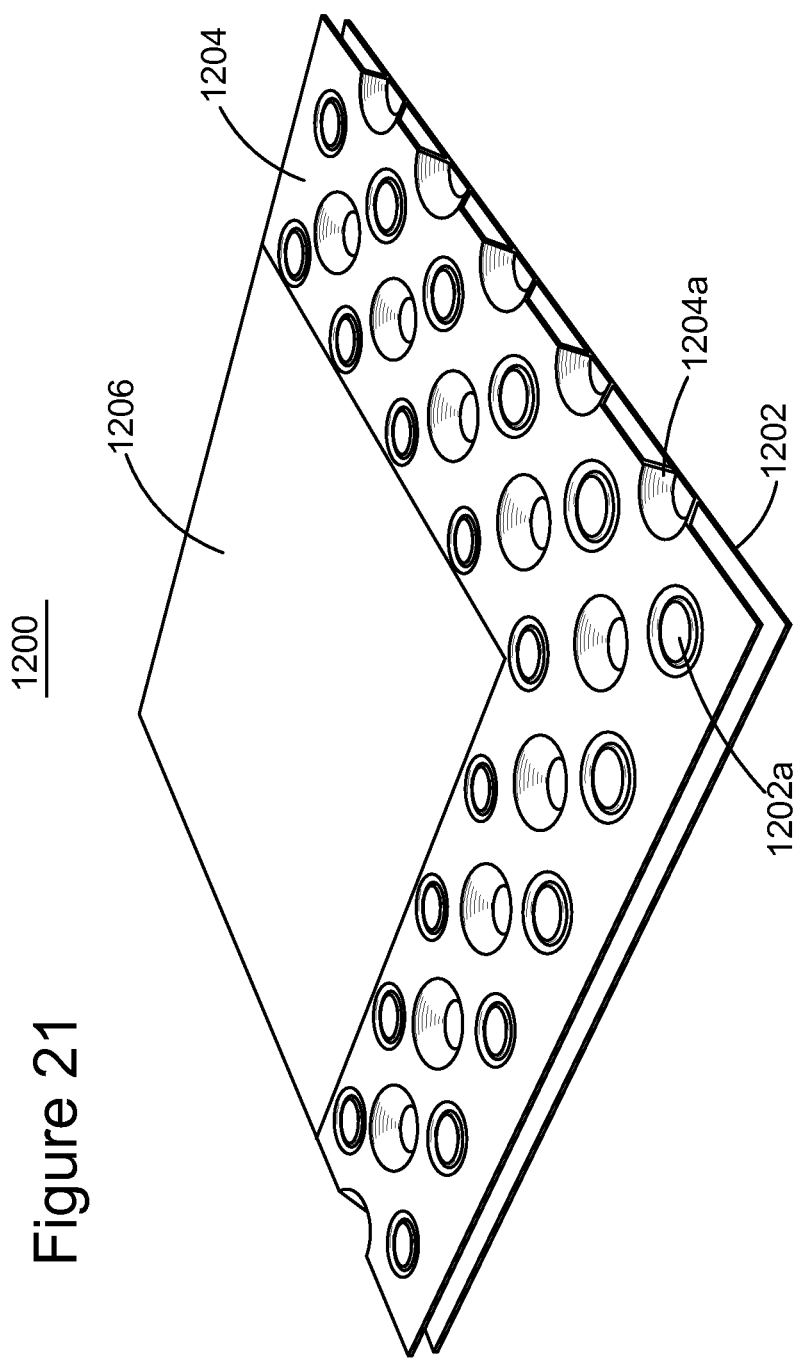
FIG. 21 is a schematic diagram of a panel having a core layer with protuberances facing a base layer according to an exemplary embodiment.

According to another exemplary embodiment illustrated in FIG. 21, a panel 1200 includes a base layer 1202, a core layer 1204 and a top layer 1206. While the base layer 1202 and the top layer 1206 may be similar to those presented in the previous embodiments, the core layer 1204 is different as discussed next.

The base layer 1202 has first protuberances 1202a similar to the embodiment illustrated in FIG. 6. The first protuberances 1202a are configured to directly contact the top layer 1206. Thus, corresponding holes are made in the core layer 1204 to permit the first protuberances to pass through the core layer. The core layer 1204 has second protuberances 1204a configured to face and contact the base layer to provide further support to the top layer 106.

Figure 22:
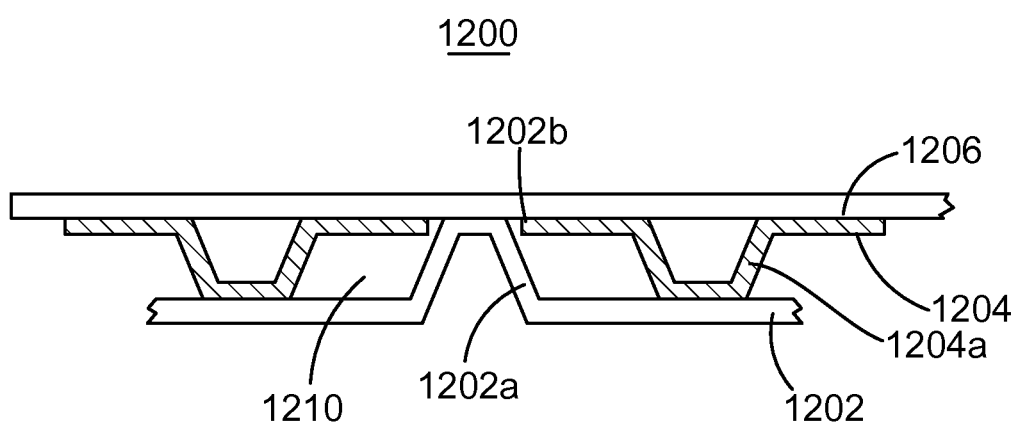
FIG. 22 is a cross-sectional view of a panel having a core layer with holes for accommodating protuberances from a base layer and also having protuberances facing the base layer according to an exemplary embodiment.

A cross-section view through the panel 1200 is shown in FIG. 22. FIG. 22 shows that pockets 1210 may be present between the base layer 1202 and the core layer 1204. The second protuberances 1204a are shown contacting the base layer 1202 and the first protuberances 1202a are shown contacting the top layer 1206. Holes 1204b are formed in the core layer 1204 for allowing the first protuberances 1202a to contact the top layer 1206. The pockets 1210 may be filed with a desired material as previously discussed, or left empty.

Figure 23:
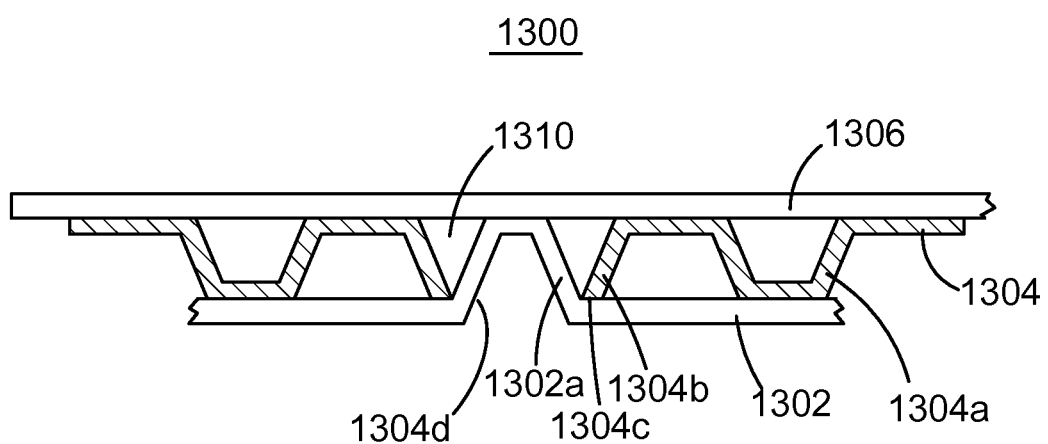
FIG. 23 is a cross-sectional view of a panel having a core layer with protuberances for accommodating protuberances of a base layer and other protuberances for facing and contacting the base layer according to an exemplary embodiment.

Another exemplary embodiment is illustrated in FIG. 23 and shows a structure similar to that of FIG. 22 with the difference that, instead of having simply holes in the core layer 1304 for accommodating the first protuberances 1302a of the base layer 1302, the novel core layer 1304 has third protuberances 1304b that also contact the base layer 1302 for increased resistance. More specifically, the third protuberances 1304b have a lip region 1304c that contacts the base layer 1302 and a hole 1304d to accommodate the first protuberances 1302a of the base layer 1302. The lip region 1304c and the hole 1304d are formed in a top region of the third protuberances 1304b.

It is noted that all the considerations discussed above with regard to the previous embodiments (e.g., type of material for each layer, filing in material for empty spaces between the layers, etc.) also apply to the embodiments shown in FIGS. 21-23. Further, it is noted that for the embodiments illustrated in FIGS. 21-23, the core layer has a flat portion facing and contacting the top layer and the second and third protuberances are facing and contacting the base layer.

Figure 24:
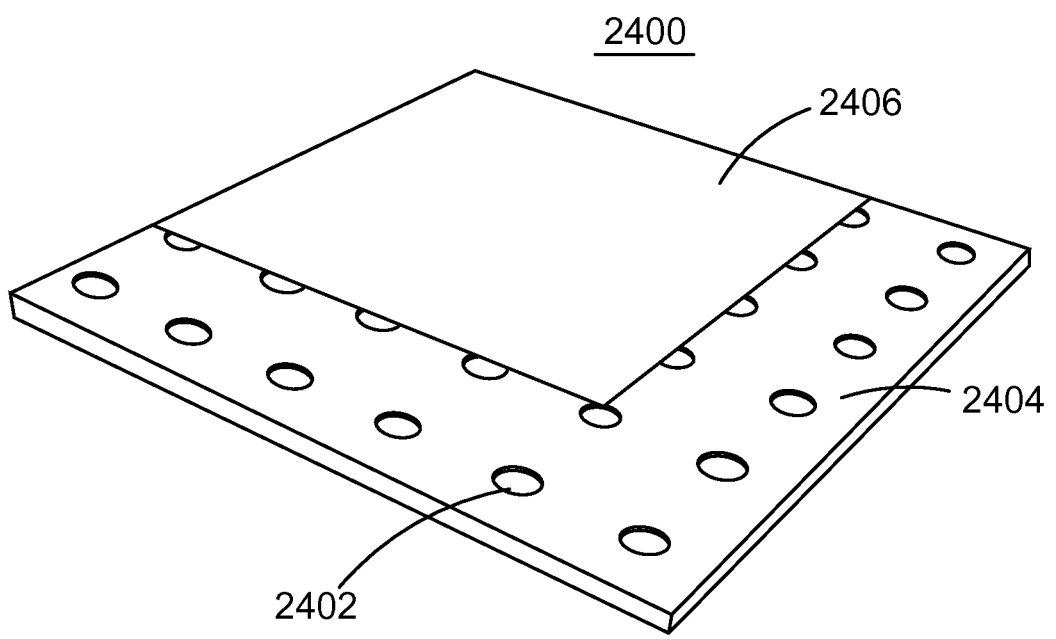
FIG. 24 is a another panel in which a core layer has voids according to an exemplary embodiment.
Figure 25B:
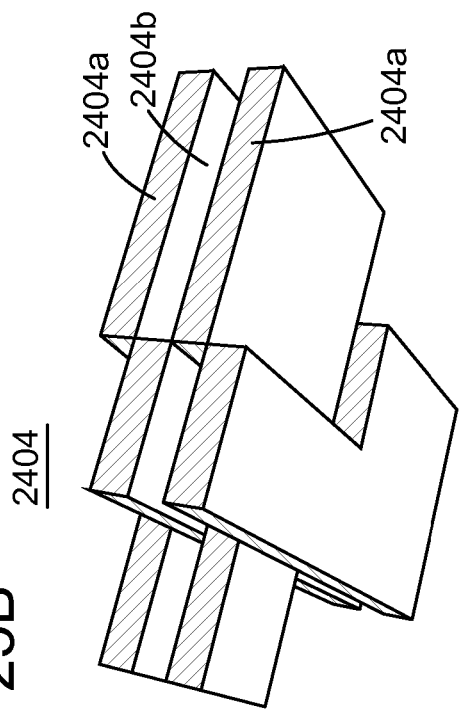
FIGS. 25A-C illustrate a core layer with voids according to an exemplary embodiment.
Figure 25A:
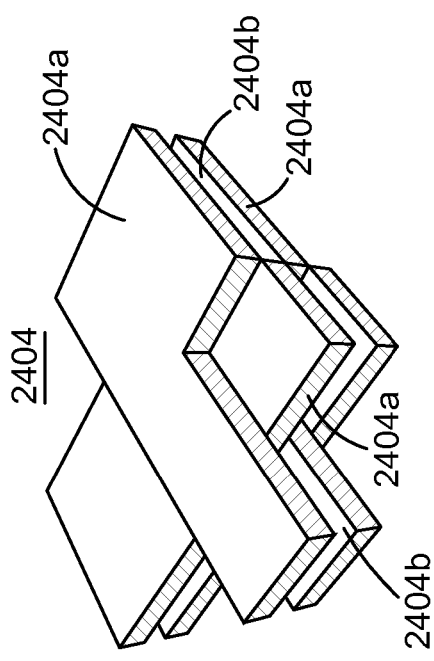
Figure 25C:
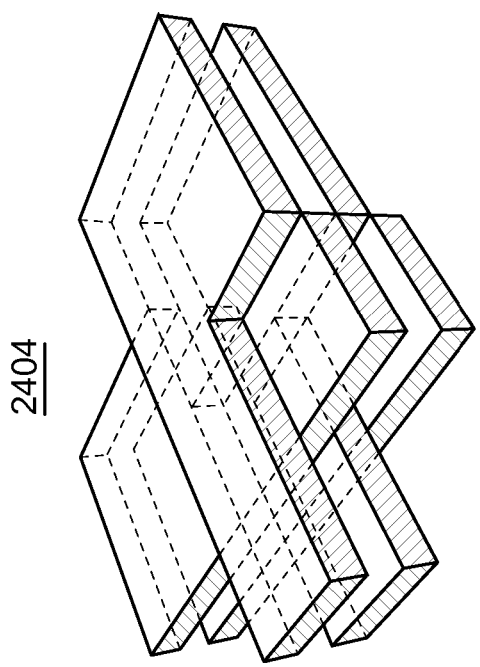

Regarding the core layer, while many embodiments have shown that the core layer may include protuberances on its own that contact the top layer, it is also possible to use the base and top layers of the previous embodiments and to provide a core layer as shown in FIG. 24. Such a panel 2400 may have the core layer 2404 made of one or more materials that include voids for lightweight and/or sound proofing properties, energy mitigation and/or increased crushing capabilities. For example, FIGS. 25A-C shows the core layer 2404 including plural sections 2404a made of one or more materials (e.g., cork, wood, plastic, composite, metal, foam, etc.) that are arranged in such a way that voids 2404b are formed between the plural sections 2404a. In this way, the voids 2404b may serve various functions as needed in the industry.

Figure 26:
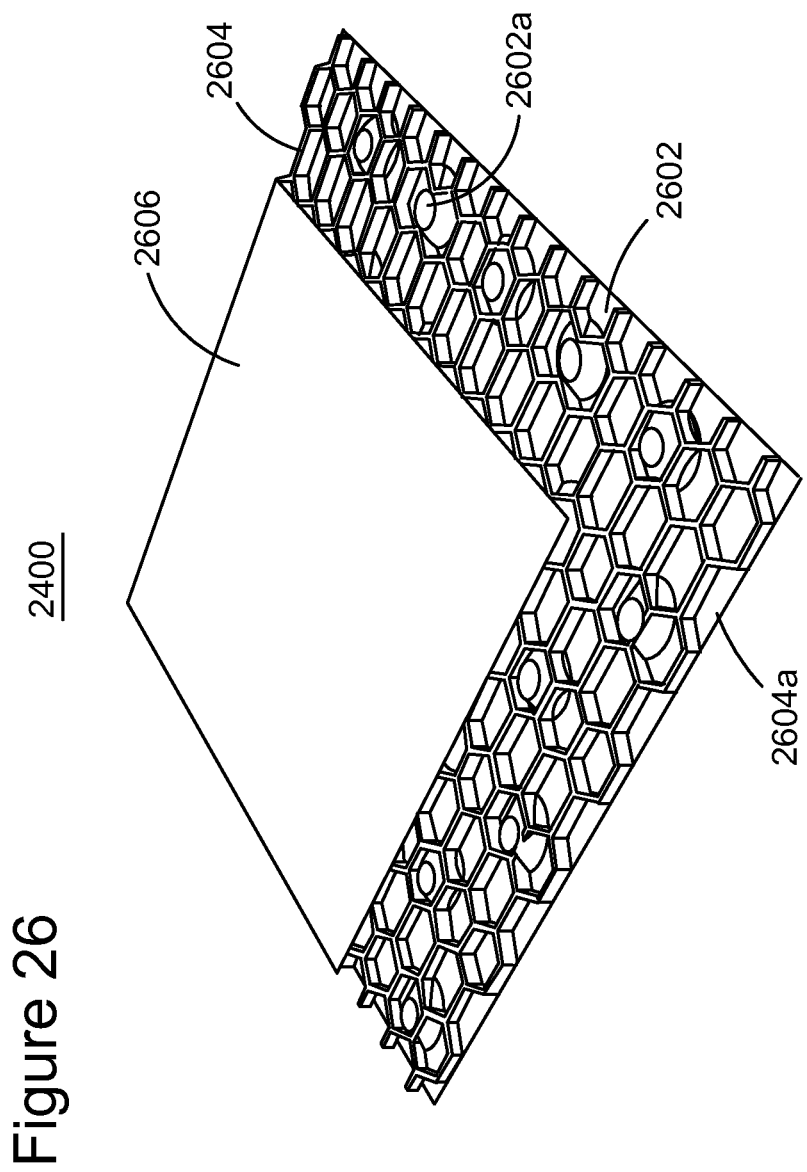
FIG. 26 illustrates a core layer having a honeycomb shape according to an exemplary embodiment.

In another embodiment illustrated in FIG. 26, a panel 2600 has a base layer 2602 having protuberances 2602a that contact a top layer 2606. The core layer 2604 includes voids 2604a to achieve the above noted functions. The core layer may have a honeycomb shape as illustrated in the figure. Other shapes may be used to achieve this core layer. It is noted that in this embodiment a void 2604a communicates with both the base and top layers while in the embodiment of FIGS. 25A-C, a void is defined by the sections of the core layer, i.e., a void does not have to communicate with the top and/or base layer.

Figure 27:
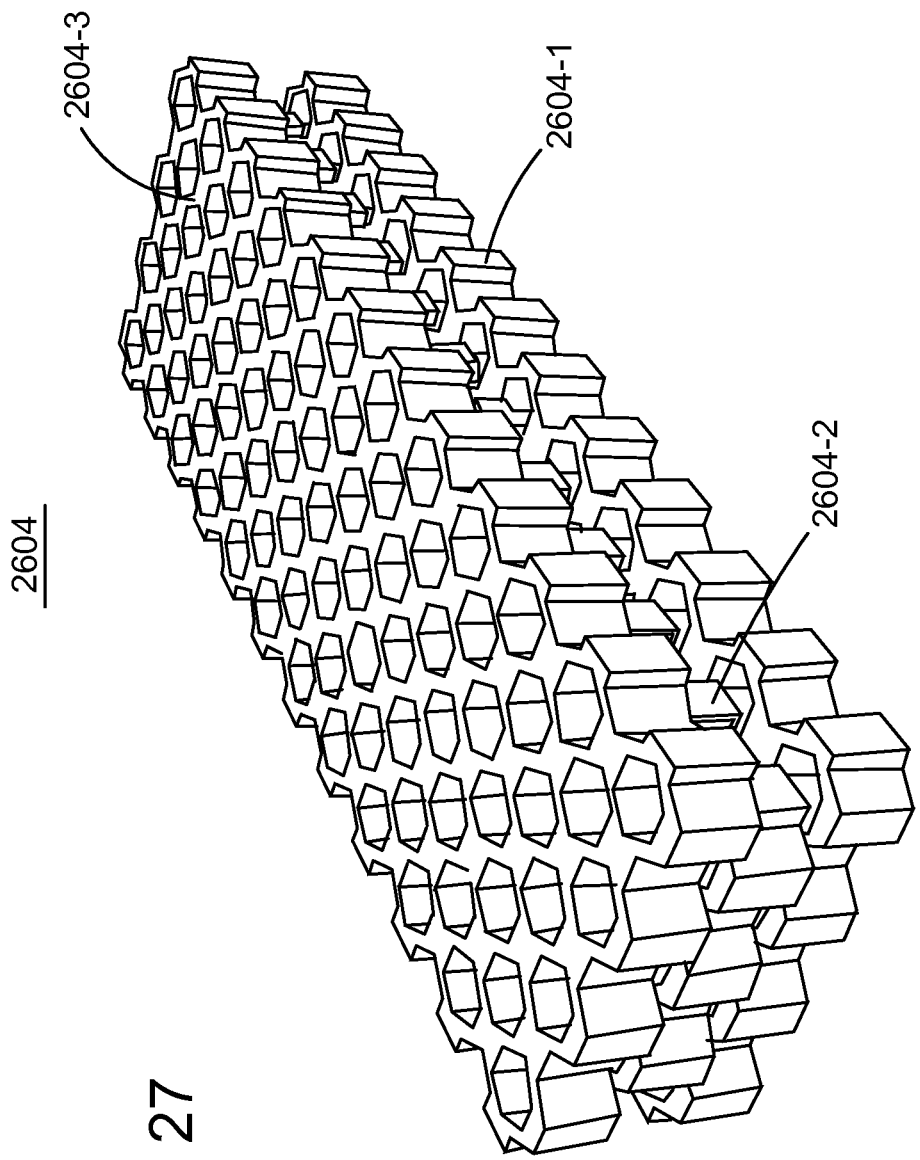
FIG. 27 illustrates a core layer having plural layers according to an exemplary embodiment.

The core layer 2604 may be formed from plural layers 2604-1 to 2604-3. FIG. 27 shows only three layers but more or less layers may be used. The layers 2604-1 to 2604-3 may be made of the same or different materials. In one embodiment, each of the layers 2604-1 to 2604-3 has a honeycomb shape. In another embodiment, the layers may have different shapes, e.g., one layer has the honeycomb shape, another layer has the shape illustrated in FIGS. 25A-C, etc.

The disclosed exemplary embodiments provide a method and panel that have an increased strength comparative to a traditional panel having similar sizes. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A panel comprising:
   a base layer configured to have plural first protuberances;
   a core layer located on the base layer and comprising plural second protuberances; and
   a top layer in direct contact with the plural first protuberances and the plural second protuberances.

2. The panel of claim 1, wherein the core layer further comprises:
   plural openings through which the plural first protuberances of the base layer passes to contact the top layer.

3. The panel of claim 2, wherein the plural openings are formed as rows and columns between rows and columns of the plural second protuberances.

4. The panel of claim 1, wherein the plural second protuberances are located between plural first protuberances so that each second protuberance has four adjacent first protuberances.

5. The panel of claim 1, wherein the top layer, the core layer and the base layer are formed from one of steel, copper, aluminum, composite, paper, plastic, metallic, non-metallic, fiber metal laminates, titanium, polymer reinforced composites, natural fibers, cork, aramid, shape memory alloys, stainless steels, glass and carbon fiber reinforced composites, metal matrix composites, ceramics, or a combinations thereof.

6. The panel of claim 1, wherein the top layer, the core layer and the base layer are made of the same material.

7. The panel of claim 1, wherein the top layer and the base layer are formed of a metallic material and the core layer is formed of a composite material.

8. The panel of claim 1, wherein the plural first protuberances have a frustoconical shape.

9. The panel of claim 1, wherein the plural second protuberances have a frustoconical shape.

10. The panel of claim 1, wherein the plural first protuberances are pressed into the base layer.

11. The panel of claim 1, wherein the plural first protuberances are attached to the base layer.

12. The panel of claim 1, wherein the plural first protuberances are made of a material different than a material of the base layer.

13. The panel of claim 1, wherein the plural second protuberances are pressed into the core layer.

14. The panel of claim 1, wherein the plural second protuberances are attached to the core layer.

15. The panel of claim 1, wherein the plural second protuberances are made of a material different than a material of the core layer.

16. The panel of claim 1, wherein a thickness of the panel is about 28 to 40 mm.

17. The panel of claim 1, wherein a thickness of each of the base and top layers is between 0.5 and 2.0 mm.

18. The panel of claim 1, wherein a height of the plural first protuberances is about 16-20 mm.

19. A panel comprising:
    a base layer configured to have plural first protuberances;
    a core layer located on the base layer and comprising plural second protuberances; and
    a top layer in direct contact with the plural first protuberances and the plural second protuberances,
    wherein the plural first protuberances are interspersed with the plural second protuberances so that they are not in contact with each other.

20. A panel comprising:
    a base layer configured to have plural first protuberances;
    a core layer located in direct contact with the base layer and comprising plural second protuberances; and
    a top layer in direct contact with the plural first protuberances and the plural second protuberances.

* * * * *